Oct. 5, 1926.

P. W. FLEISCHER ET AL 1,601,910

MULTISPINDLE DOUBLE SEAMER

Filed Jan. 9, 1922 27 Sheets-Sheet 1

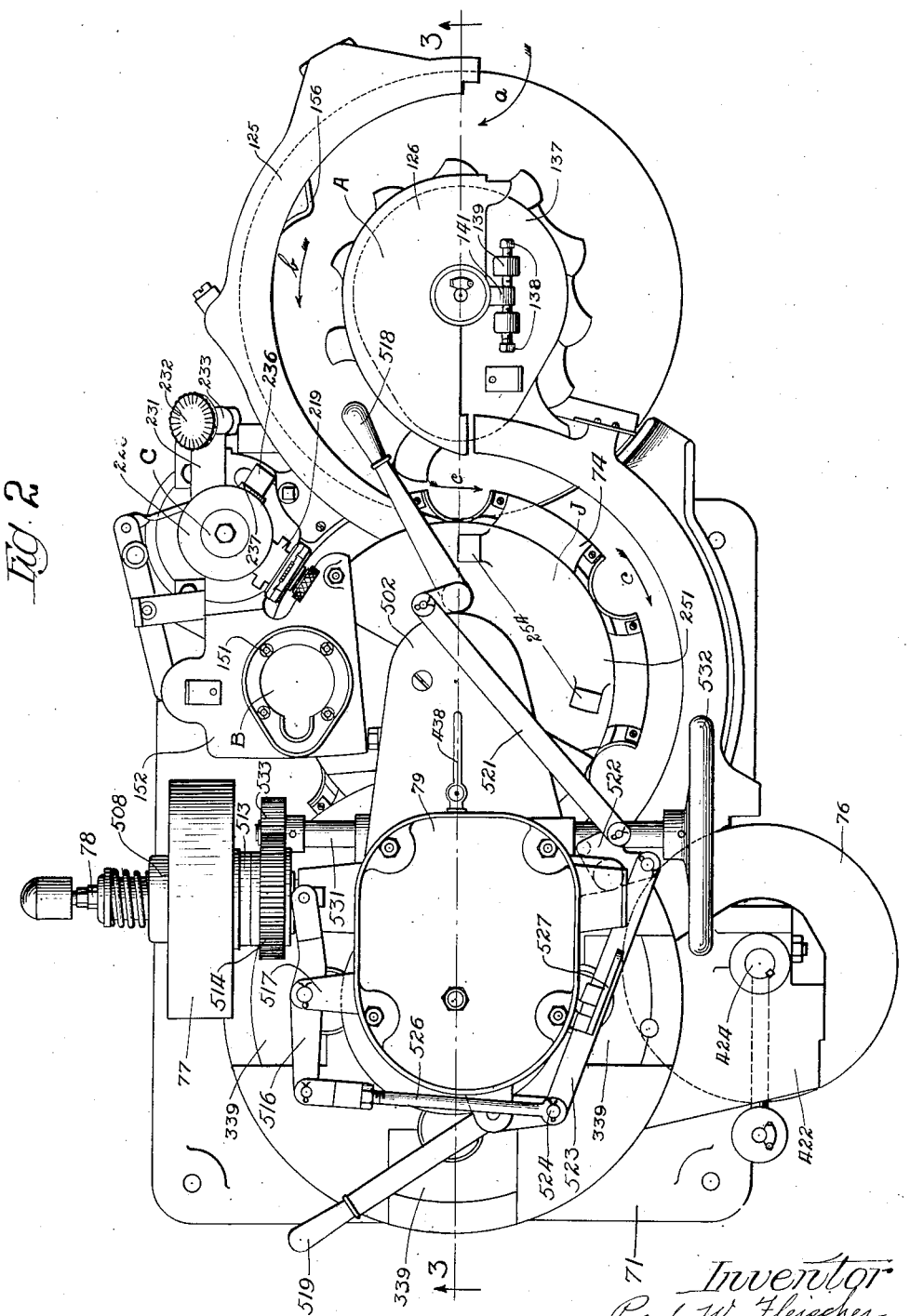

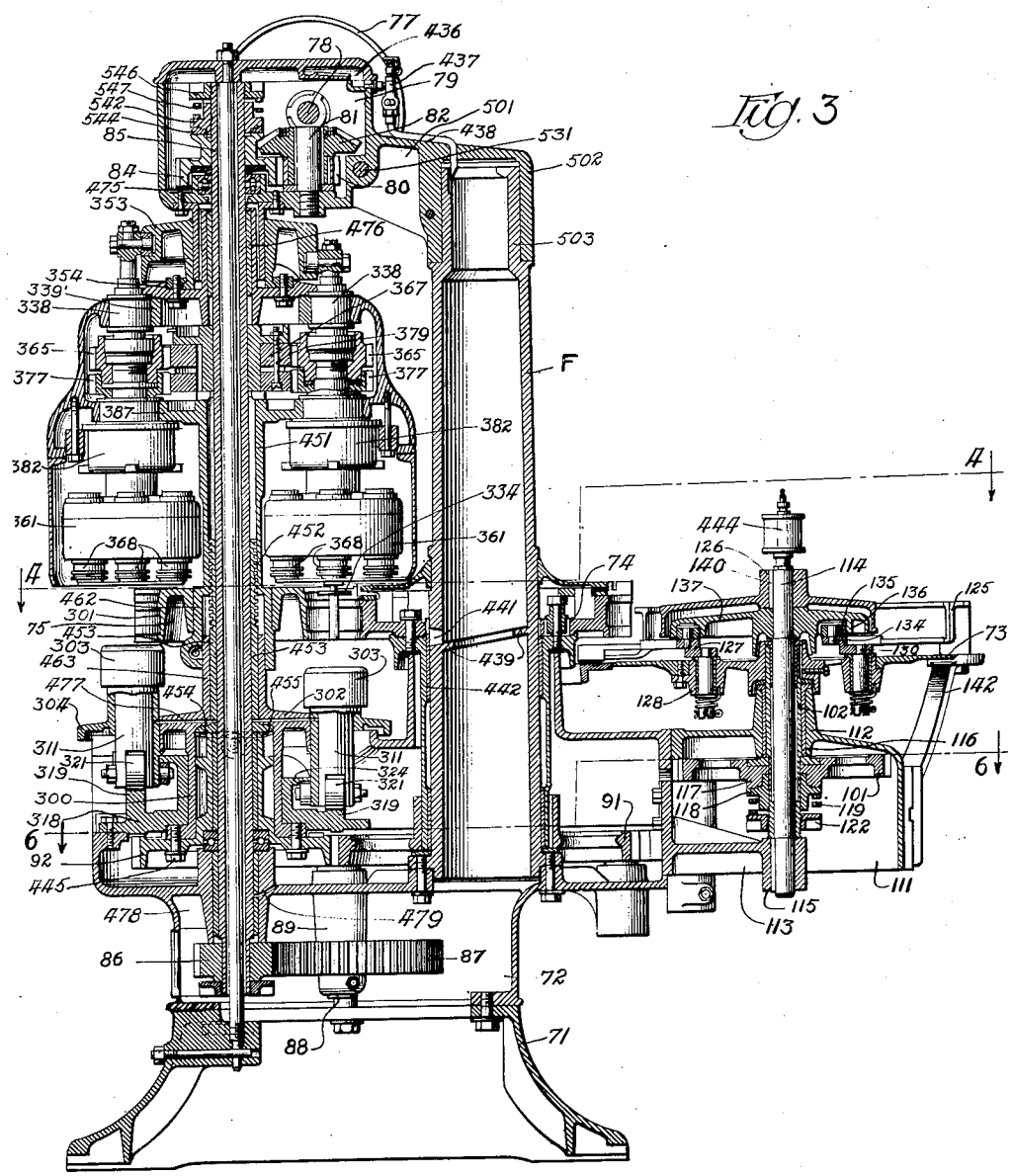

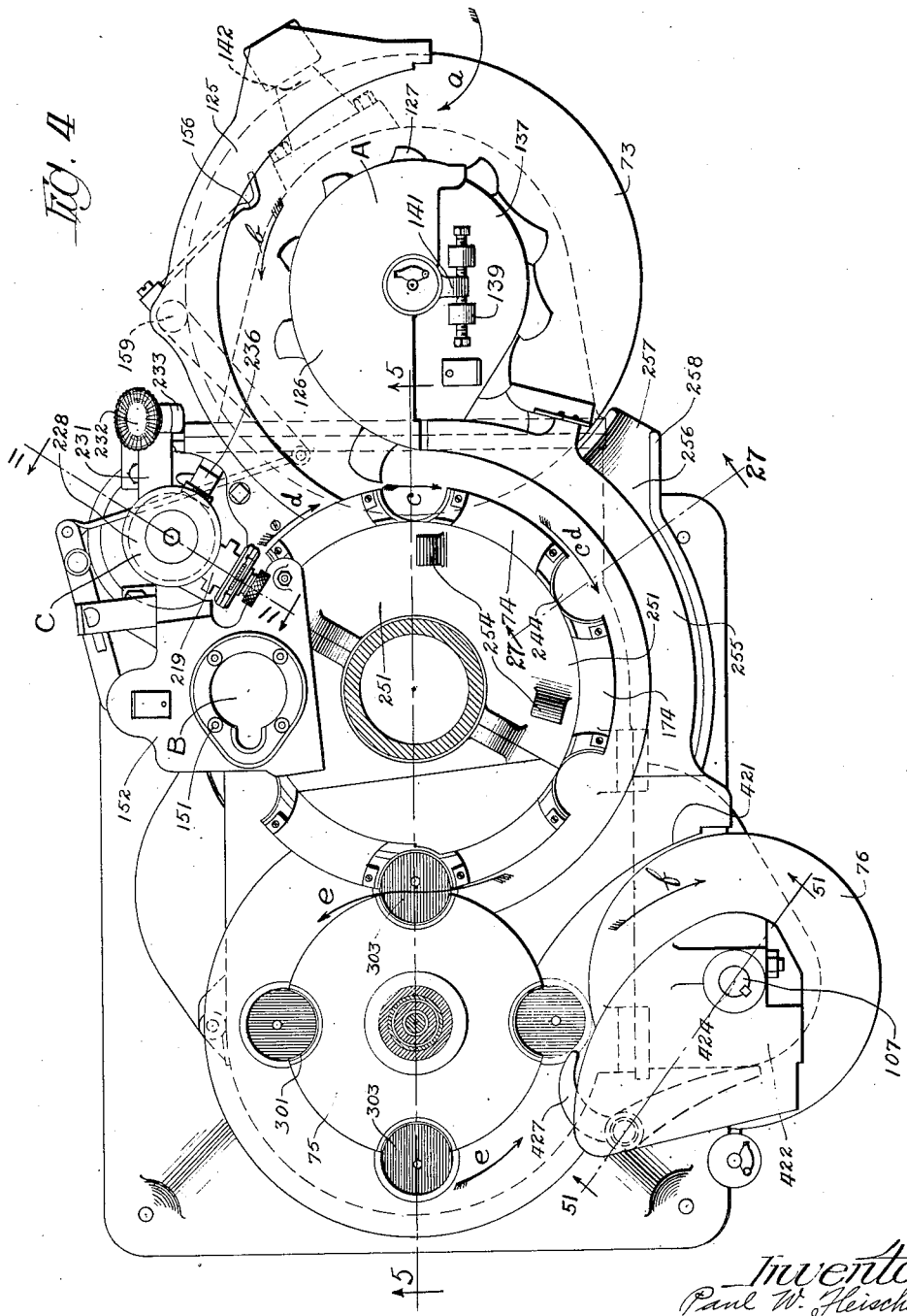

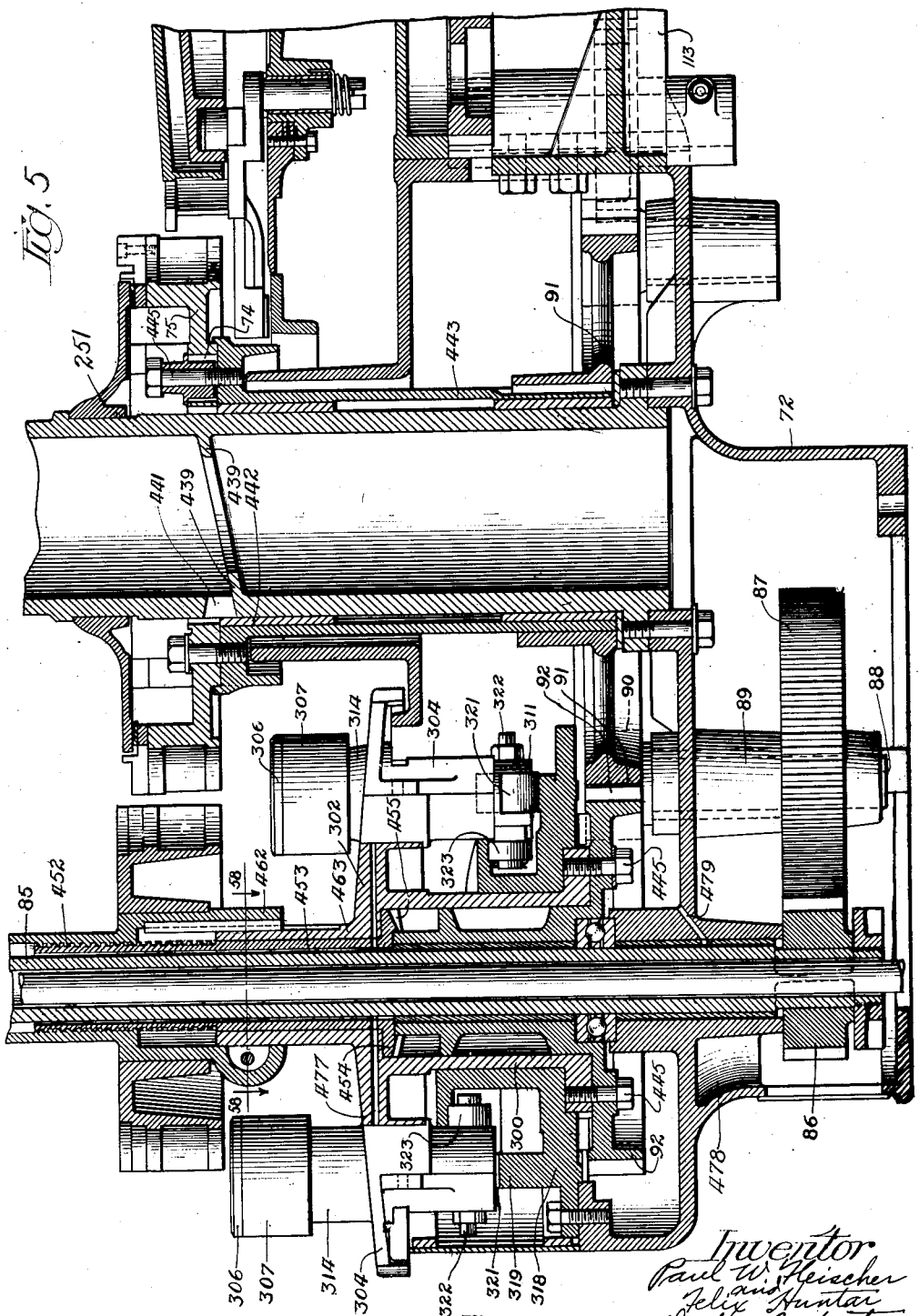

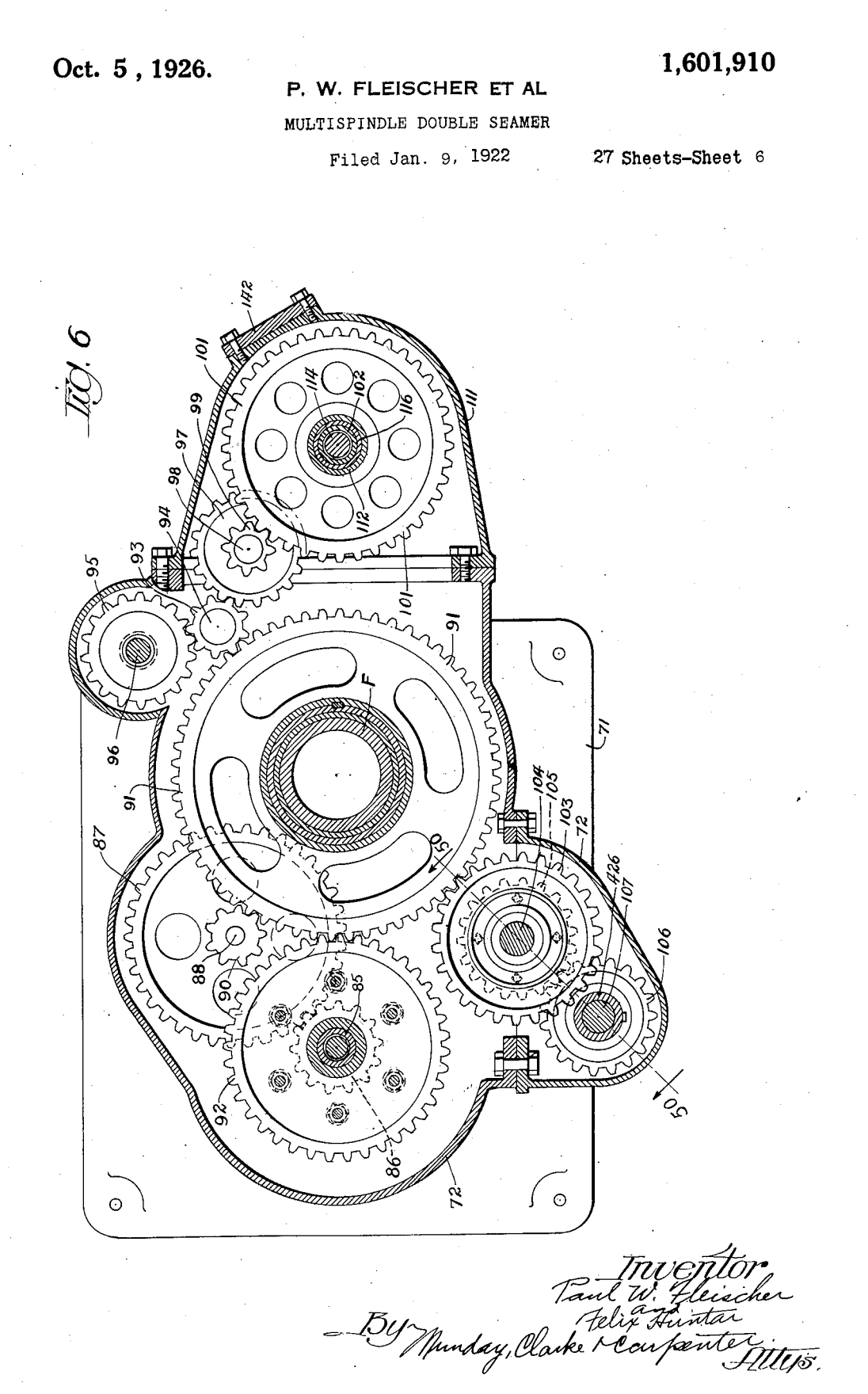

Oct. 5, 1926.  
P. W. FLEISCHER ET AL  
1,601,910  
MULTISPINDLE DOUBLE SEAMER  
Filed Jan. 9, 1922  
27 Sheets-Sheet 7
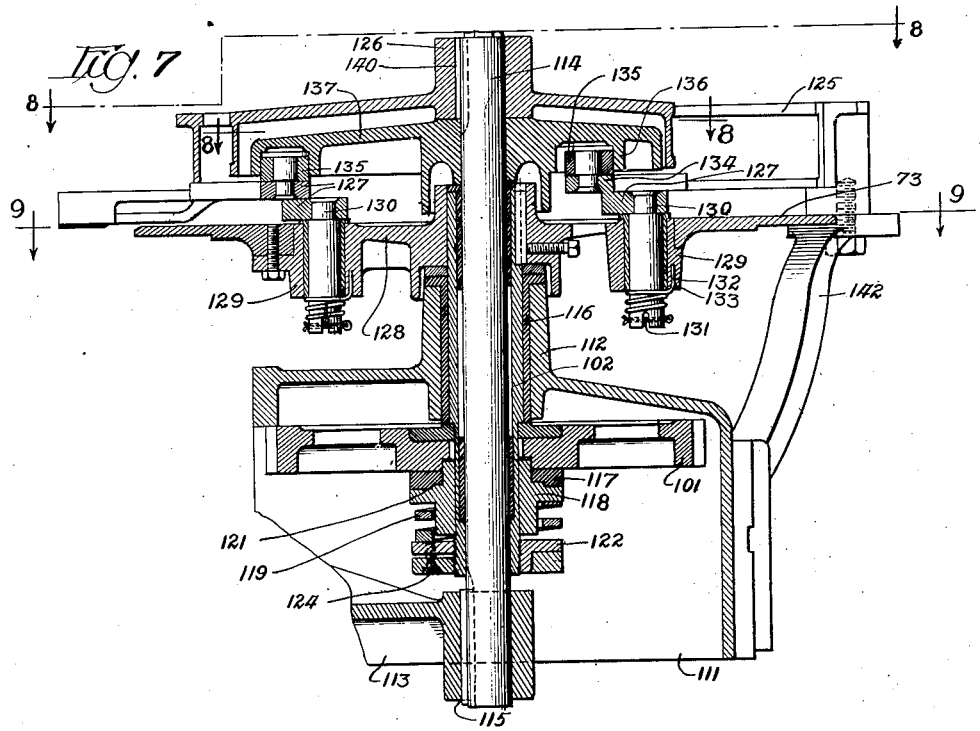
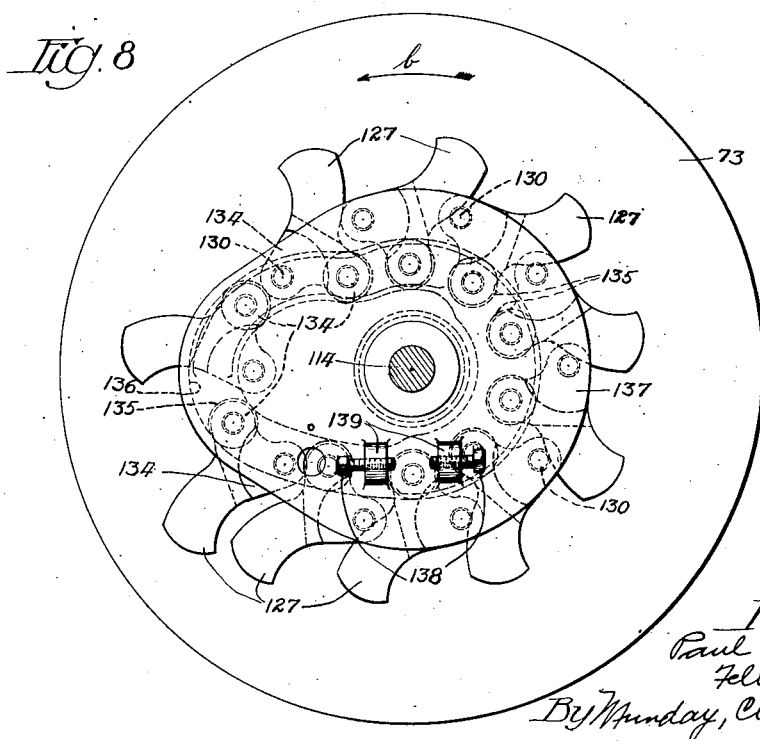

Oct. 5, 1926.  
P. W. FLEISCHER ET AL  
1,601,910  
MULTISPINDLE DOUBLE SEAMER  
Filed Jan. 9, 1922  
27 Sheets-Sheet 8

Oct. 5, 1926.  
P. W. FLEISCHER ET AL  
MULTISPINDLE DOUBLE SEAMER  
Filed Jan. 9, 1922

Inventor  
Paul W. Fleischer & Felix Hunts  
By Munday, Clarke & Carpenter  
Attys

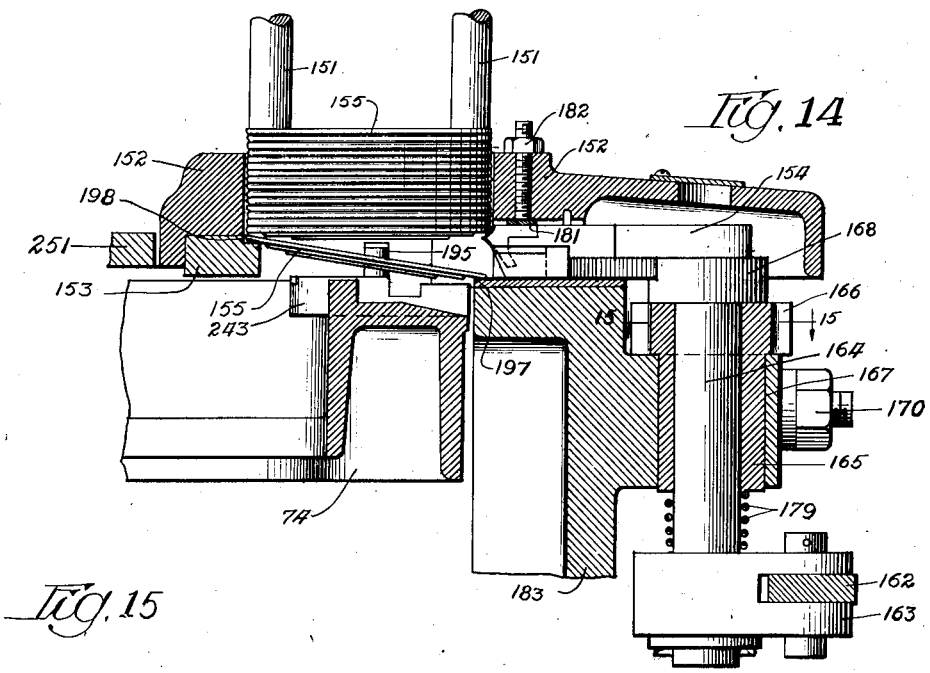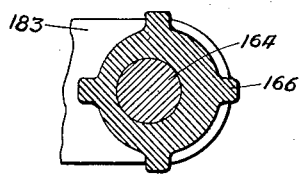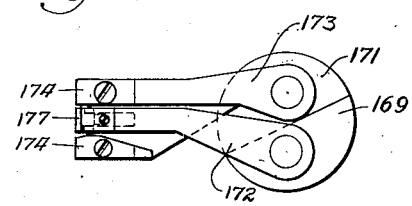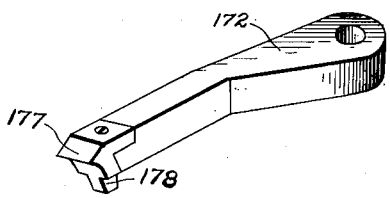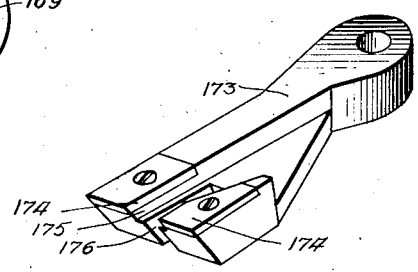

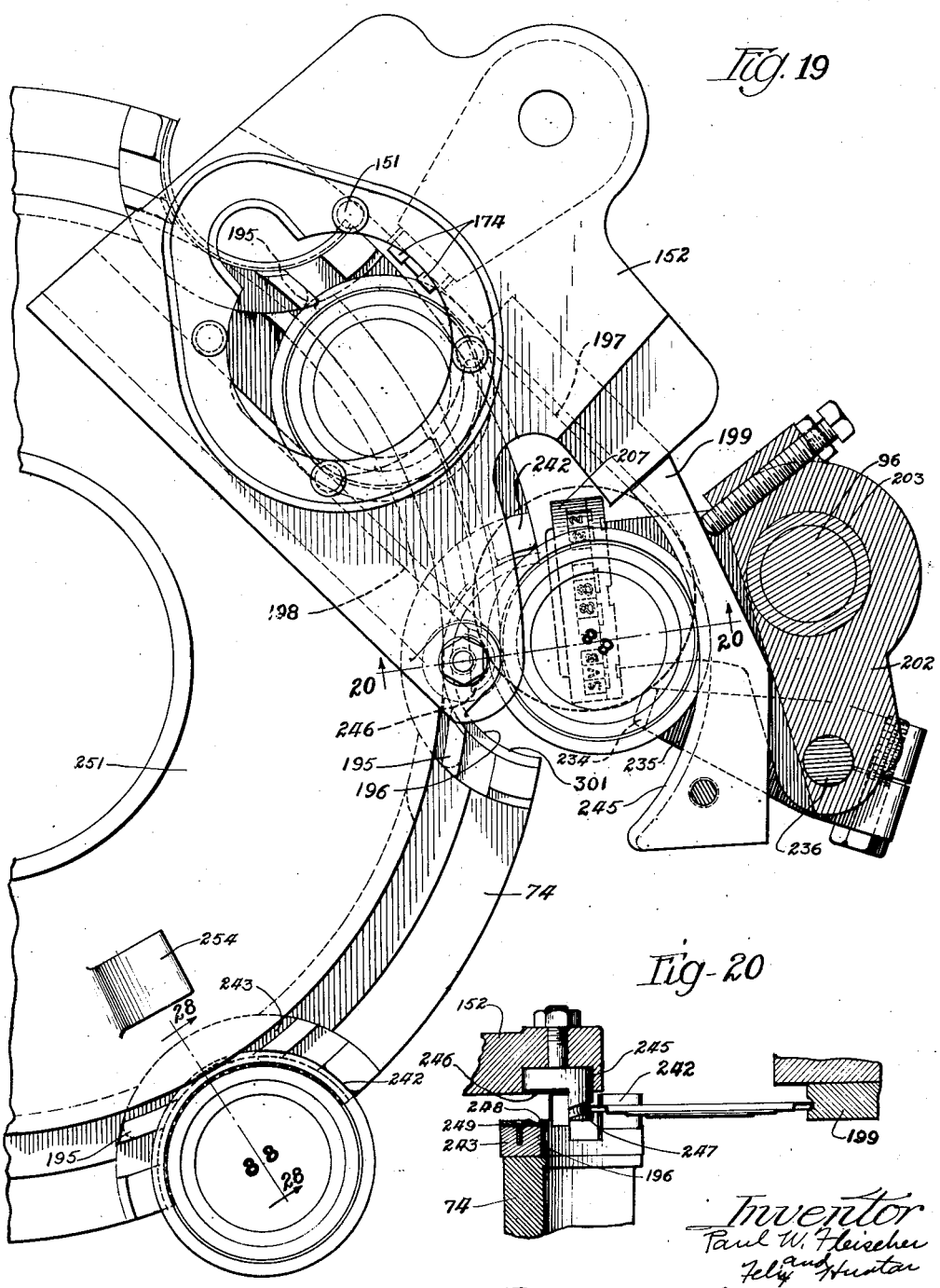

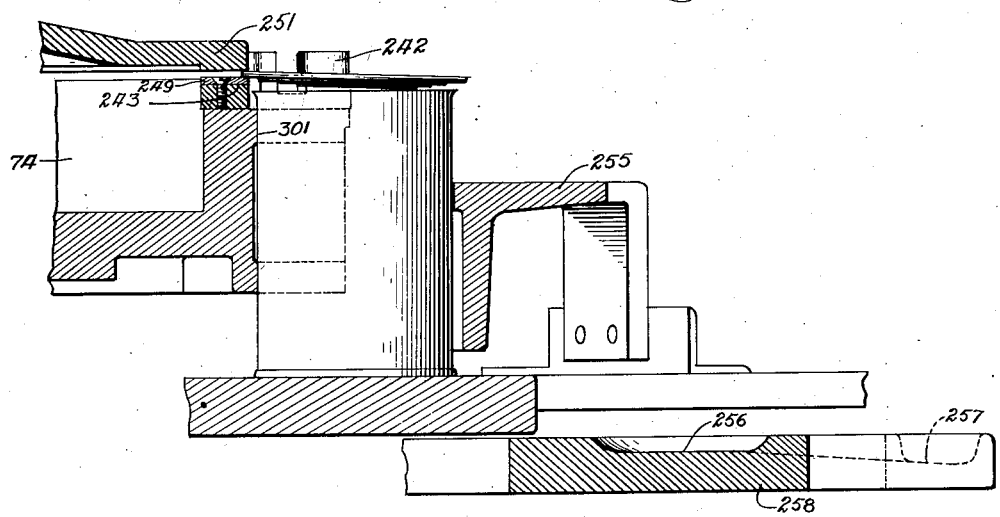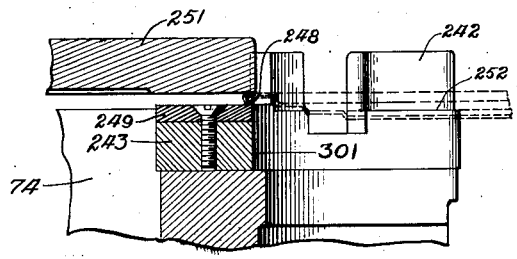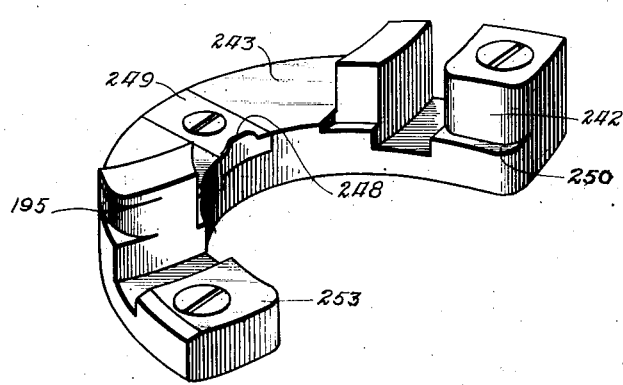

Oct. 5, 1926. 1,601,910
P. W. FLEISCHER ET AL
MULTISPINDLE DOUBLE SEAMER
Filed Jan. 9, 1922 27 Sheets-Sheet 13
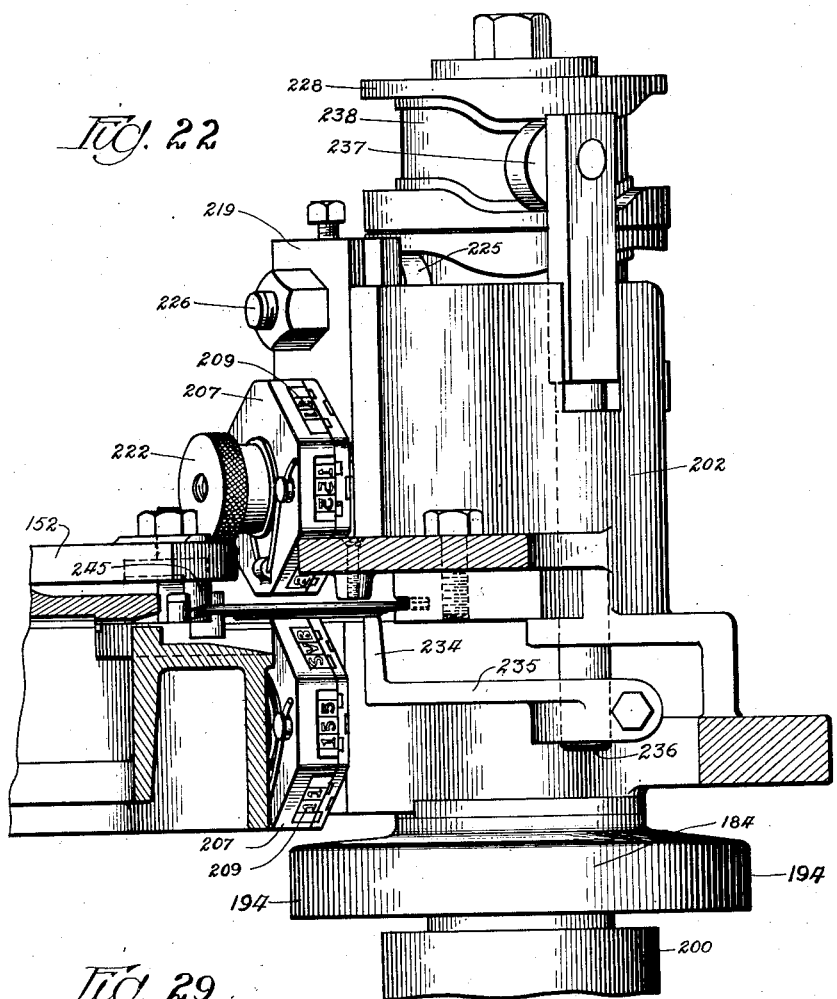
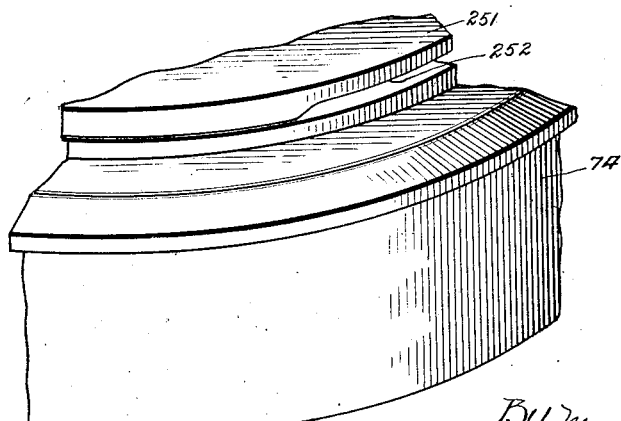
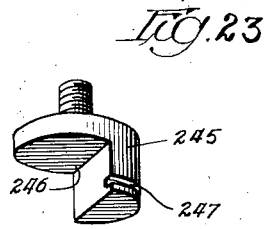

Oct. 5, 1926. 1,601,910
P. W. FLEISCHER ET AL
MULTISPINDLE DOUBLE SEAMER
Filed Jan. 9, 1922 27 Sheets-Sheet 14
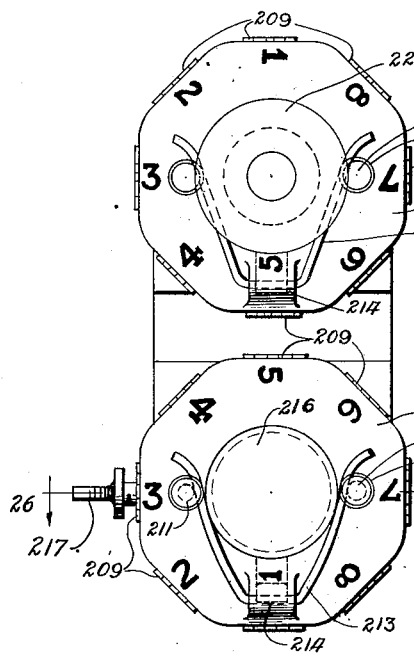
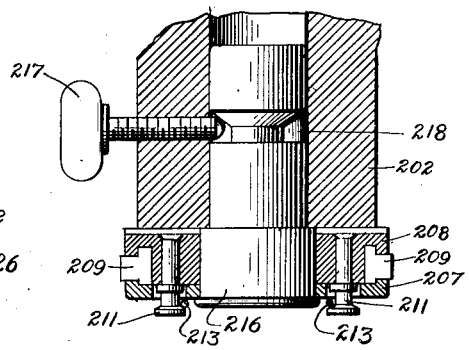
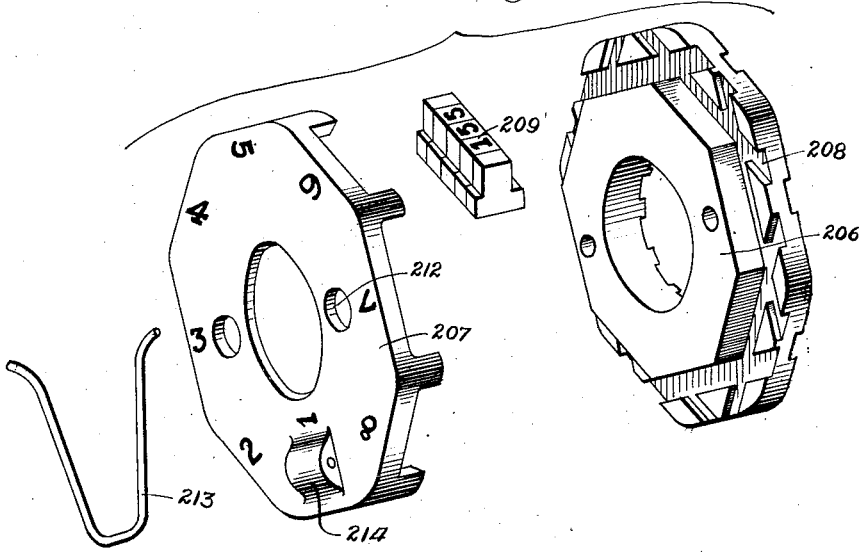

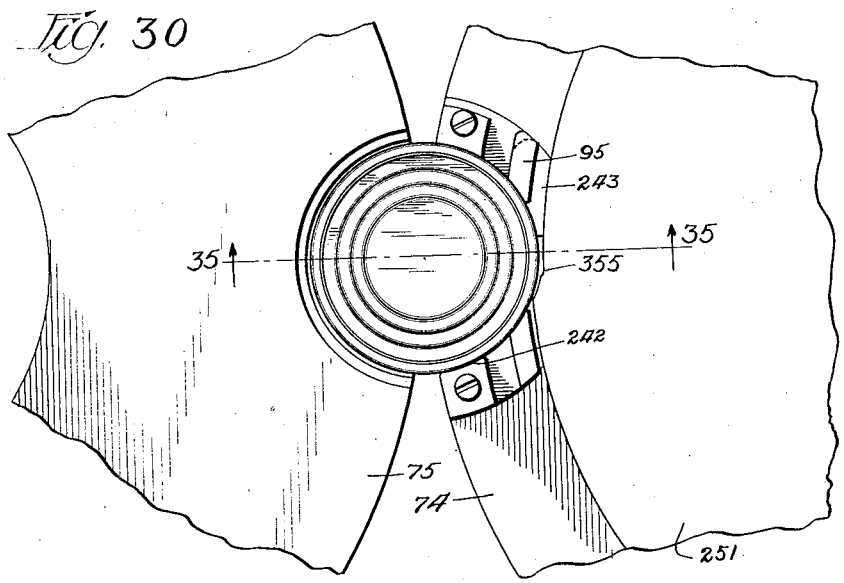
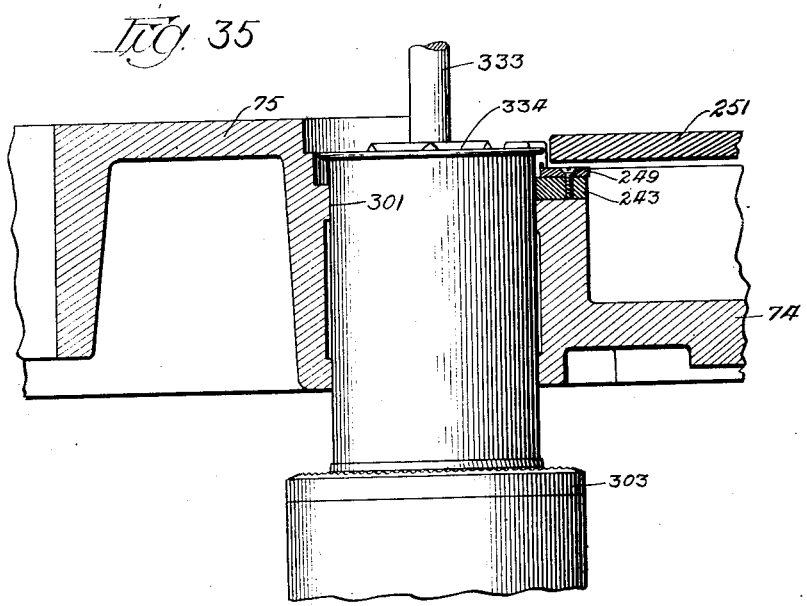

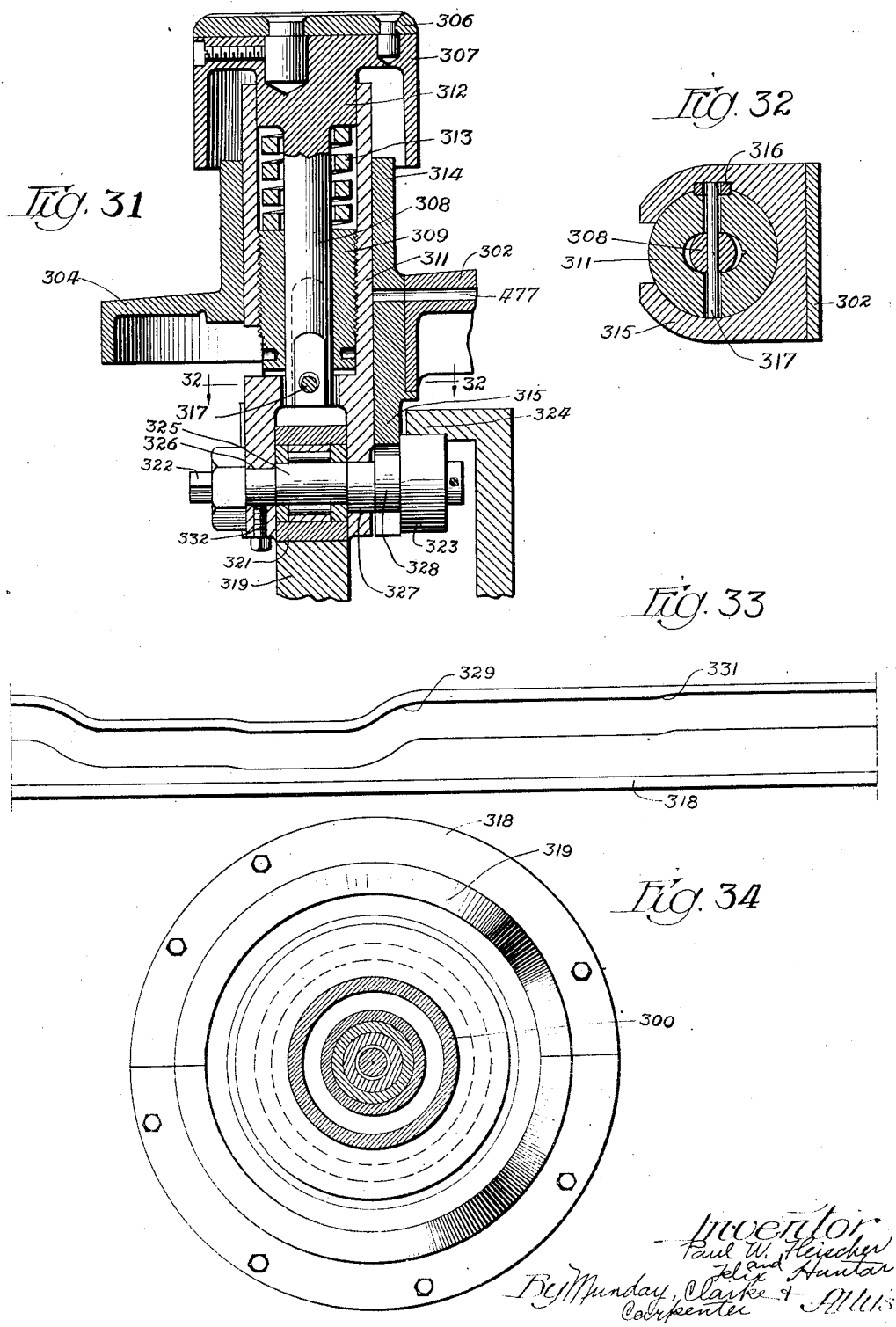

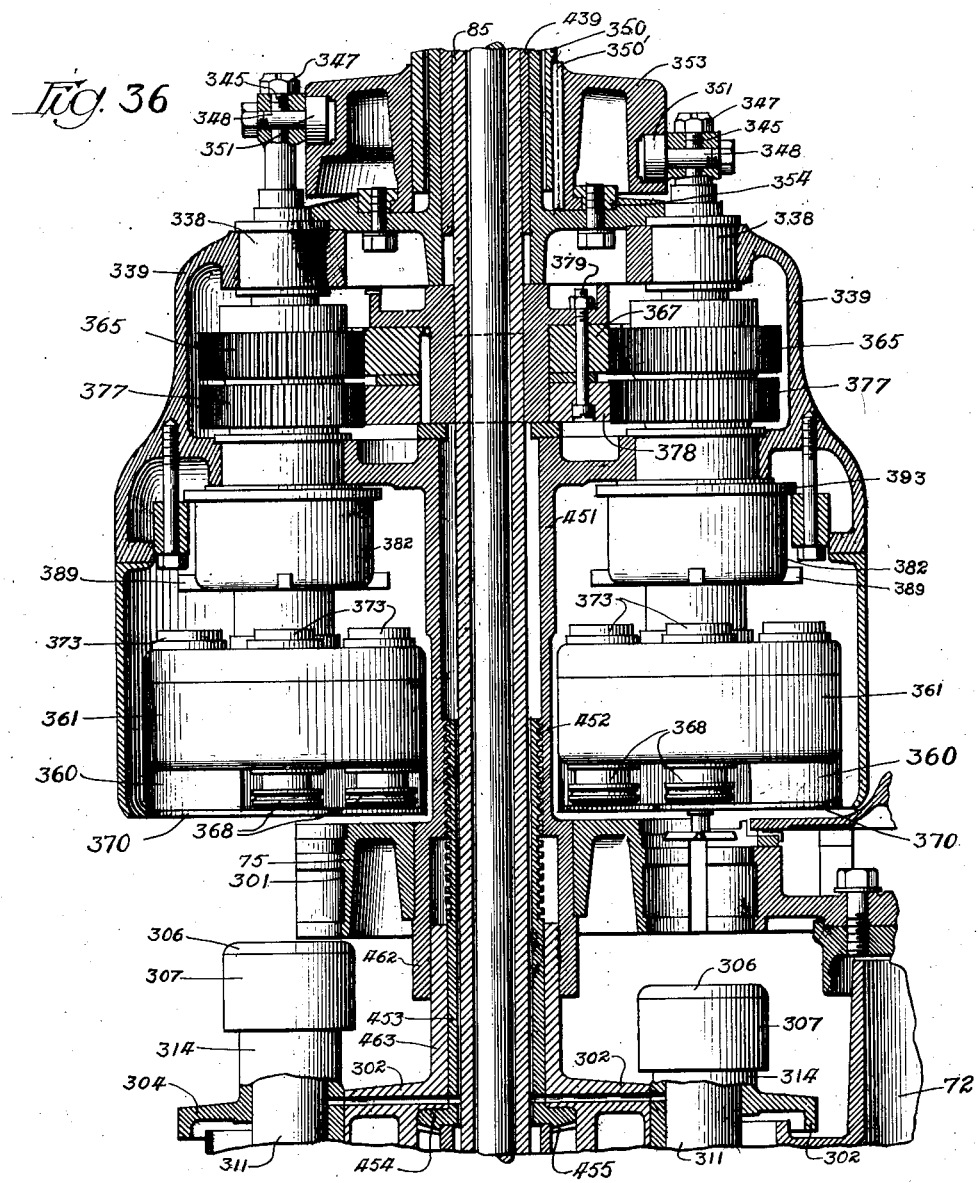

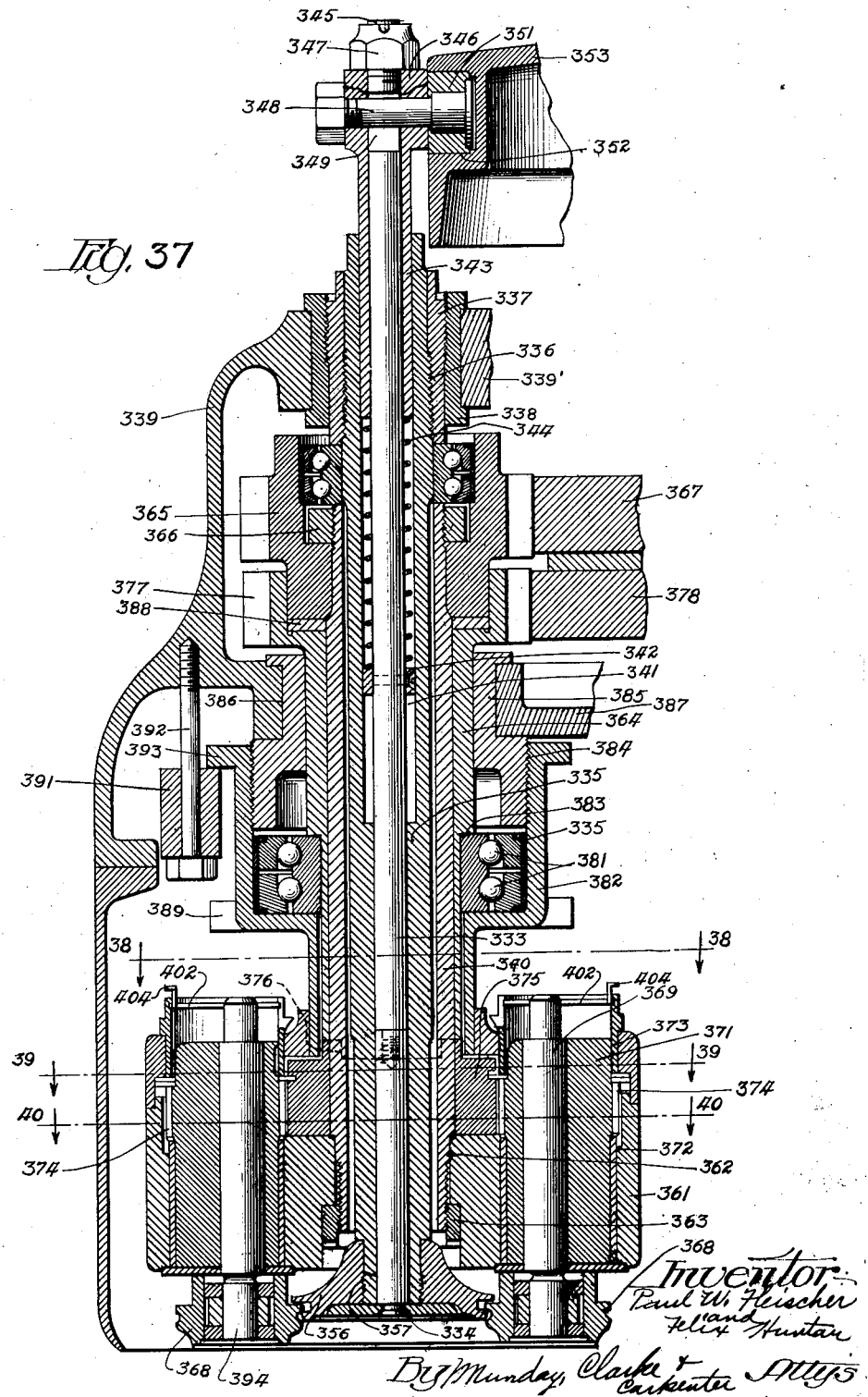

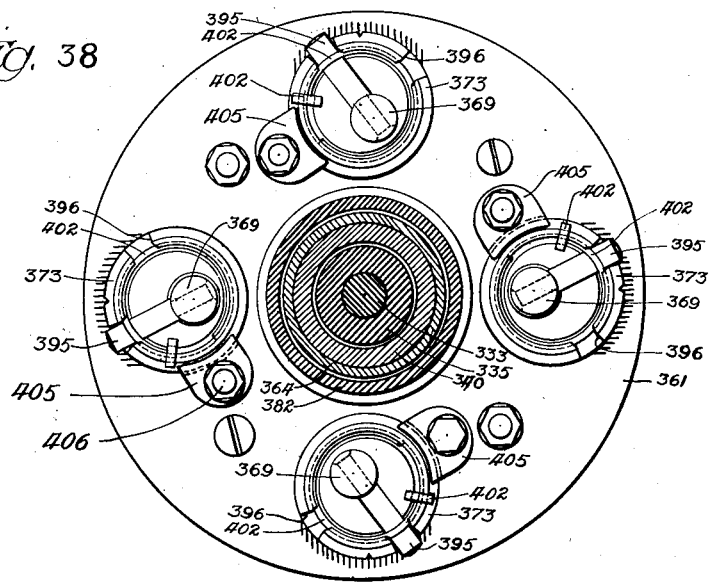
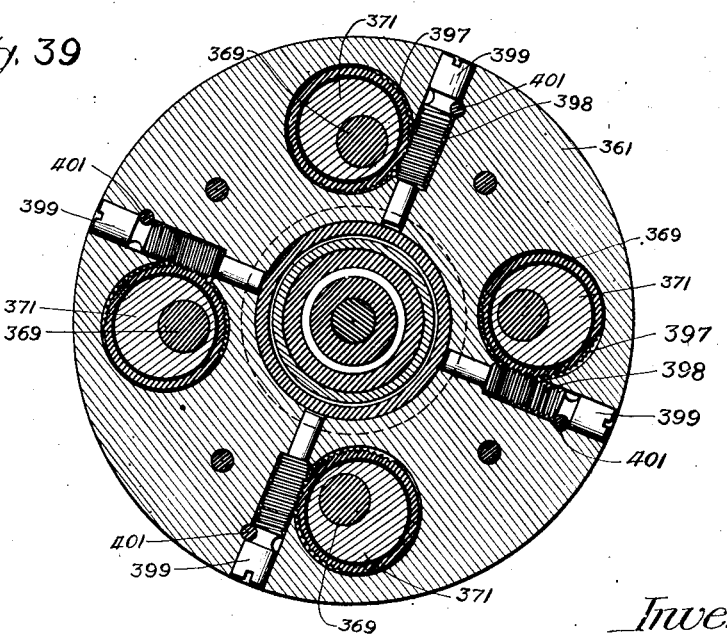

Oct. 5, 1926.
P. W. FLEISCHER ET AL
1,601,910
MULTISPINDLE DOUBLE SEAMER
Filed Jan. 9, 1922
27 Sheets-Sheet 20
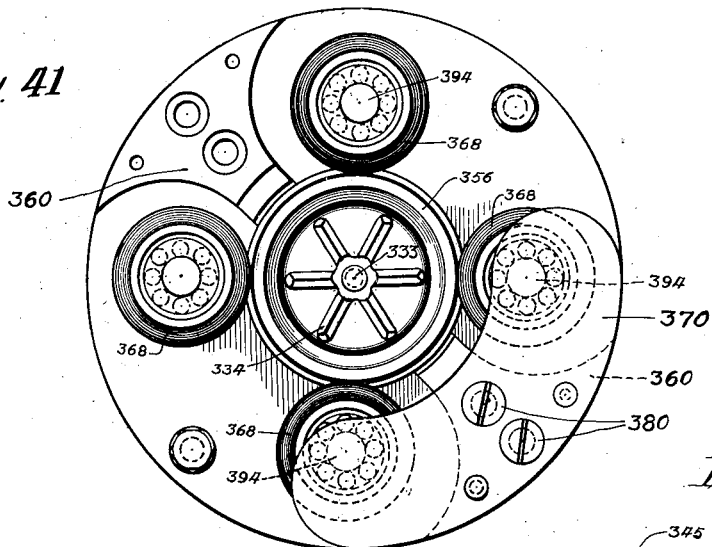
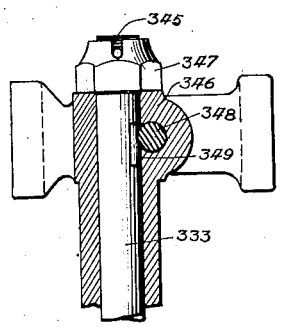
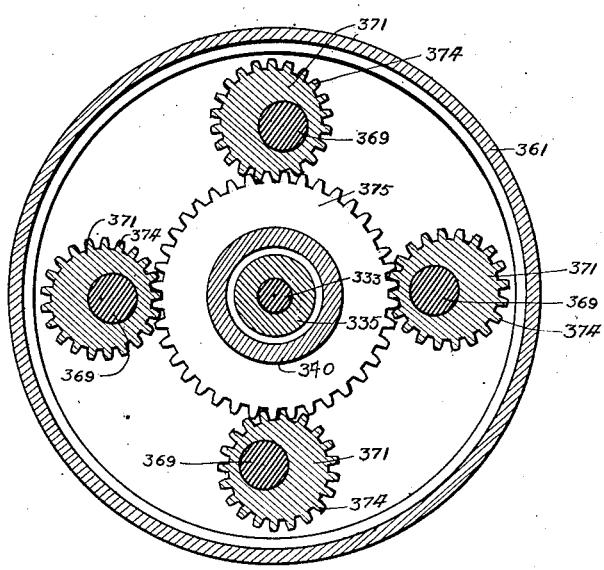

Oct. 5, 1926.
P. W. FLEISCHER ET AL
1,601,910
MULTISPINDLE DOUBLE SEAMER
Filed Jan. 9, 1922 27 Sheets-Sheet 21
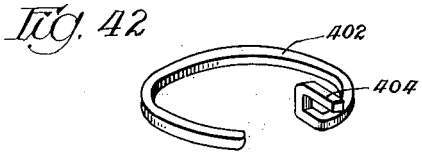
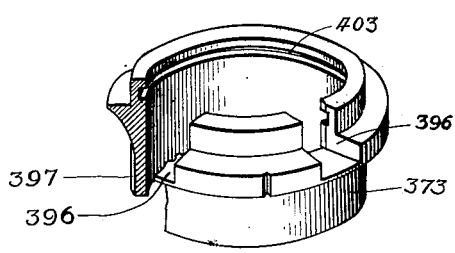
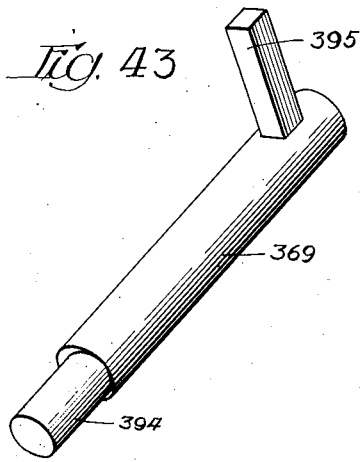
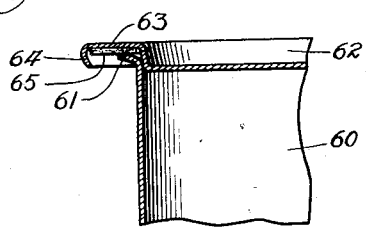
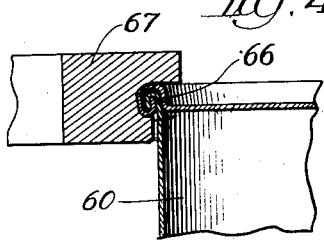
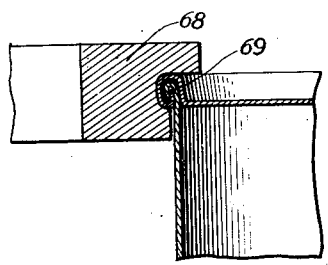

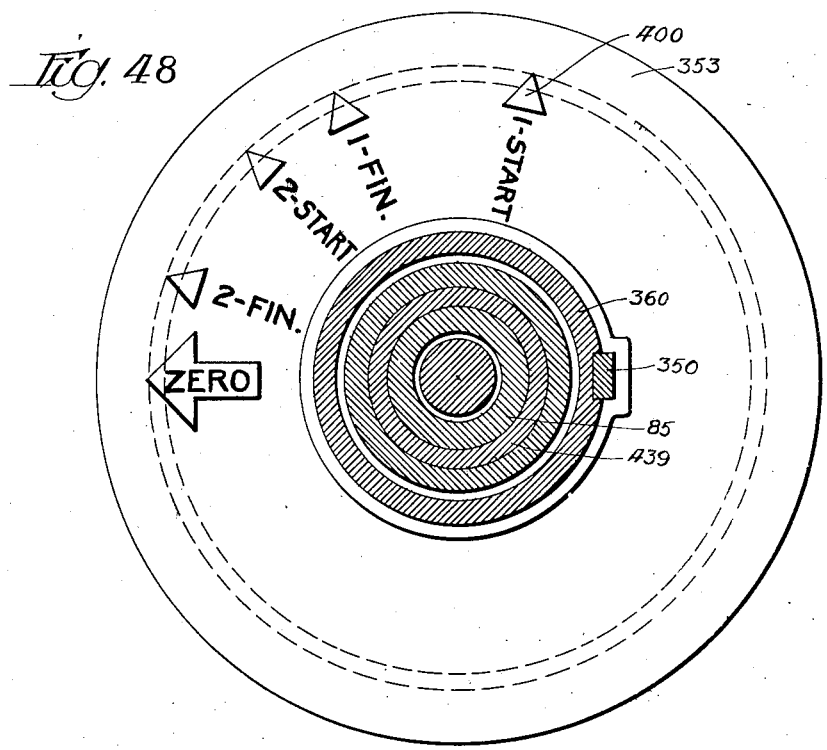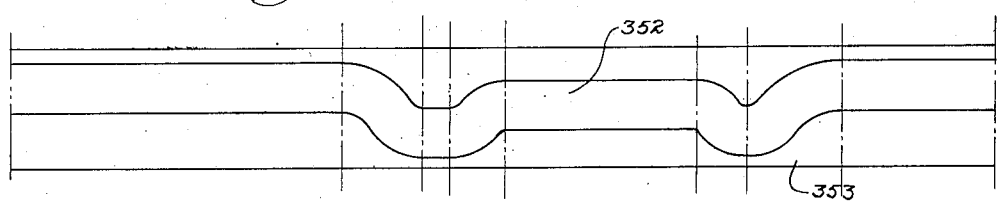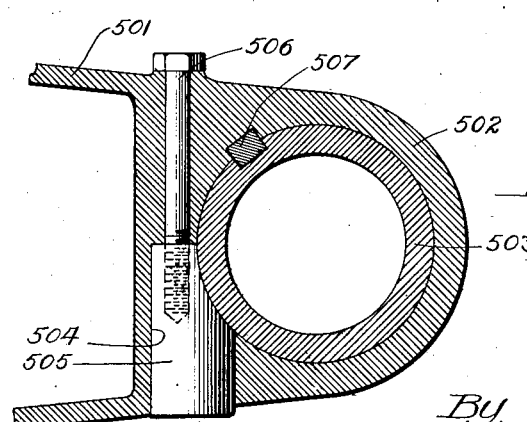

Oct. 5, 1926. 1,601,910
P. W. FLEISCHER ET AL
MULTISPINDLE DOUBLE SEAMER
Filed Jan. 9, 1922 27 Sheets-Sheet 23
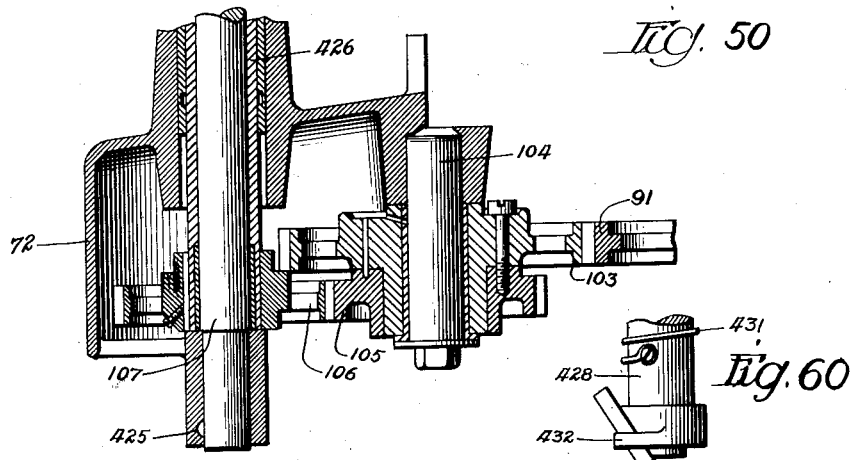
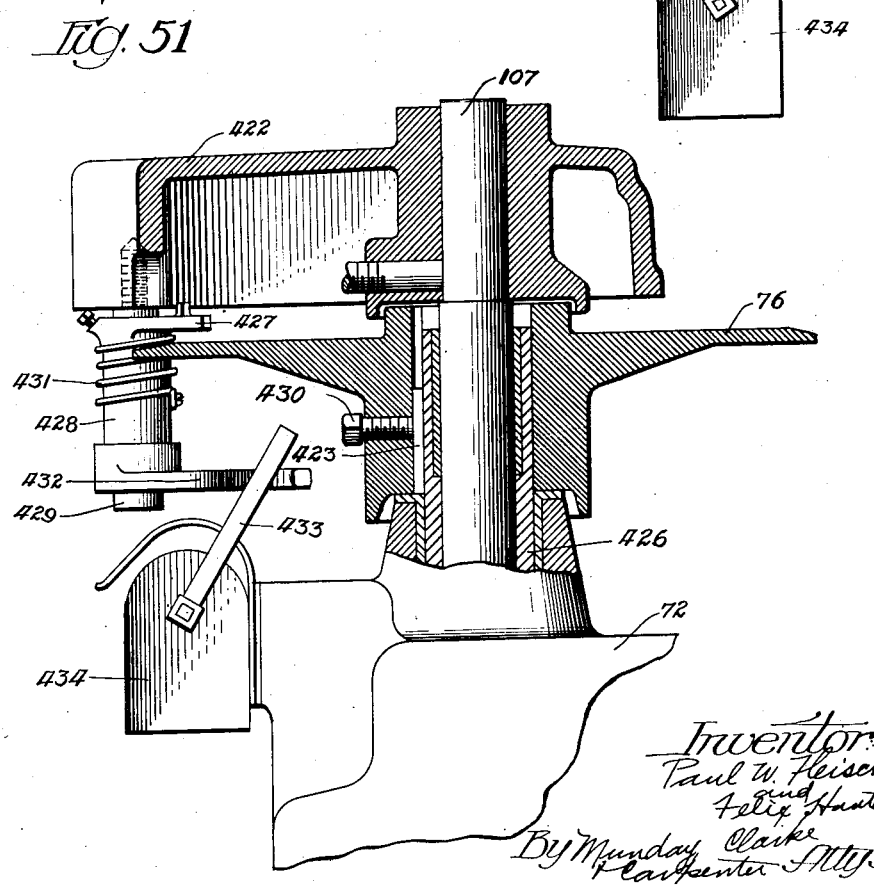

Oct. 5, 1926.

P. W. FLEISCHER ET AL 1,601,910

MULTISPINDLE DOUBLE SEAMER

Filed Jan. 9, 1922

Inventor
Paul W. Fleischer
and
Felix Hunter
By Munday, Clarke,
Harpenter Attys

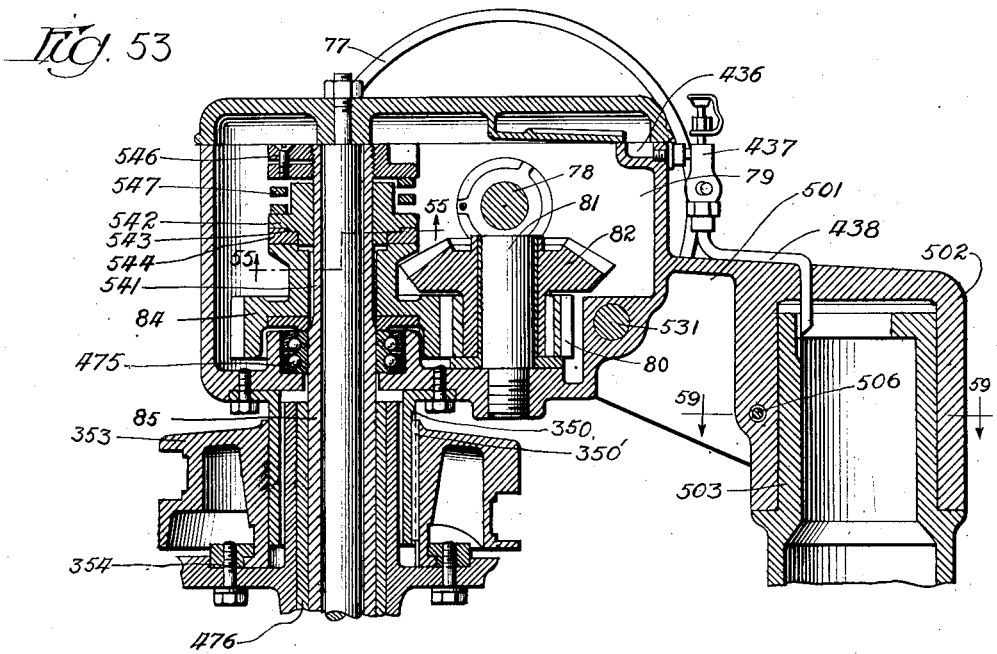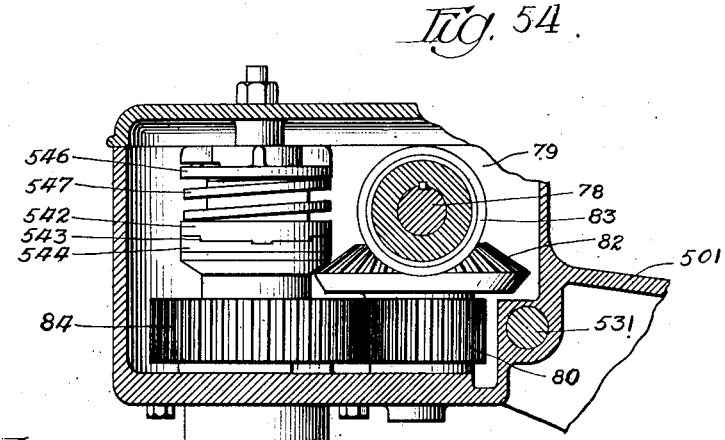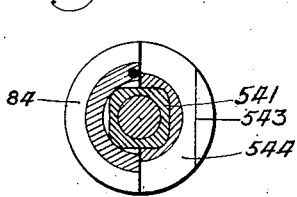

Oct. 5, 1926. 1,601,910
P. W. FLEISCHER ET AL
MULTISPINDLE DOUBLE SEAMER
Filed Jan. 9, 1922 27 Sheets-Sheet 26

Inventor
Paul W. Fleischer
Felix Hunter
By Munday, Clarke & Carpenter
Attys

Patented Oct. 5, 1926.

1,601,910

UNITED STATES PATENT OFFICE.

PAUL W. FLEISCHER, OF WEEHAWKEN, AND FELIX HUNTAR, OF HILLSIDE, NEW JERSEY, ASSIGNORS TO AMERICAN CAN COMPANY, OF NEW YORK, N. Y., A CORPORATION OF NEW JERSEY.

MULTISPINDLE DOUBLE SEAMER.

Application filed January 9, 1922. Serial No. 527,807.

This invention relates in general to machines for uniting can ends to filled can bodies, and while it has more particular reference to multi-spindle double seamers, it is desired to protect such features of it as may be useful in other connections when so used.

A principal object of the invention is the provision of an improved multi-spindle double seamer of high speed, accurate action, and capable of operation without frequent repair, replacement or readjustment.

The invention has for a further object the provision of a machine of this character, readily accurately adjustable to cans of different height, different diameters, and having wide adaptability.

Another and highly important object of the invention is the provision of a machine of ready, easy adjustment. The importance of this is perhaps best realized when it is pointed out that this machine is primarily intended for use by packers of fruit and vegetable products, who not infrequently are without mechanics highly skilled in the matter of such adjustment. The keeping quality of the product depends almost invariably upon the tightness of the seams and unless the adjustment of the seaming rolls be extremely accurate extensive spoilage results.

Another important object of this invention is the provision of a machine of this character, which will have smooth operation, reducing and practically eliminating the spilling of the contents of the can and preventing the liquid content coming in contace with the fibre gasket, if fibre gaskets be used in the ends, until the actual making of the seam, so that the liquid may not swell the gasket and cause the seam to become loose from the drying out and consequent shrinking of the gasket.

Another highly important object of the invention is the provision of a new and improved marking apparatus for the marking of can ends by positive direct action without slowing up the operation of the machine.

Another important object of the invention is the provision of a machine wherein the seaming parts may be relatively small without loss of efficiency or reduction in speed of operation.

Another important object of the invention is the provision of a simple system for complete lubrication and from a centralized point.

The foregoing are merely some of the advantages and it is believed impossible to list them all, the general aim being to provide a machine vastly better in every respect than any of those heretofore placed upon the market.

Numerous other objects and advantages of the invention will be apparent as it is better understood from the following description, which, taken in connection with the accompanying drawings, discloses a preferred embodiment thereof.

Referring to the drawings:—

Fig. 2 is a top plan view thereof;

Fig. 3 is a vertical section taken substantially on the line 3—3 of Fig. 2;

Fig. 4 is a horizontal section taken substantially on the line 4—4 of Fig. 3;

Fig. 5 is a section taken substantially on the line 5—5 of Fig. 4;

Fig. 6 is a horizontal section taken substantially on the line 6—6 of Fig. 3;

Fig. 7 is a vertical partial section through the can timing apparatus;

Fig. 8 is a top plan view thereof being taken on the line 8—8 of Fig. 7;

Fig. 11 is a section taken substantially on the line 11—11 of Fig. 4;

Fig. 12 is a section taken substantially on the line 12—12 of Fig. 11;

Fig. 13 is a section taken substantially on the line 13—13 of Fig. 11;

Fig. 14 is a partial enlarged section through the cover or end feeding mechanism;

Fig. 15 is a section taken substantially on the line 15—15 of Fig. 14;

Fig. 16 is a top plan view of the feeding fingers;

Fig. 17 is an enlarged perspective view of a can end separating member of the feeding mechanism;

Fig. 18 is a similar view of the companion feeding member;

Fig. 19 is an enlarged partial plan of the cover feed and marking apparatus partially shown in section;

Fig. 20 is a section taken substantially on the line 20—20 of Fig. 19;

Fig. 21 is an enlarged perspective view of a can end pocket member of the transfer turret;

Fig. 22 is an enlarged side elevation of the marking mechanism;

Fig. 23 is a perspective view of the cover guide stud of the marking mechanism;

Fig. 24 is a side elevation of the marking dies and die holders;

Fig. 25 is an enlarged perspective view of the die holder with the marking die showing the parts dissembled;

Fig. 26 is a section taken substantially on the line 26—26 of Fig. 24;

Fig. 27 is a section taken substantially on the line 27—27 of Fig. 4;

Fig. 28 is a partial sectional view taken on the line 28—28 of Fig. 19;

Fig. 29 is an enlarged partial perspective view of the transfer turret and cover plate;

Fig. 30 is a partial top plan view of the transfer and seaming turrets;

Fig. 31 is a vertical sectional view of a can lift of a seaming mechanism;

Fig. 32 is a section taken substantially on the line 32—32 of Fig. 31;

Fig. 33 is a development of the can lift cam;

Fig. 34 is a section taken above the can lift cam;

Fig. 35 is a section on the line 35—35 of Fig. 30;

Fig. 36 is an enlarged vertical detail section through the seaming mechanism;

Fig. 37 is a similar view through a single seaming head;

Figure 1:
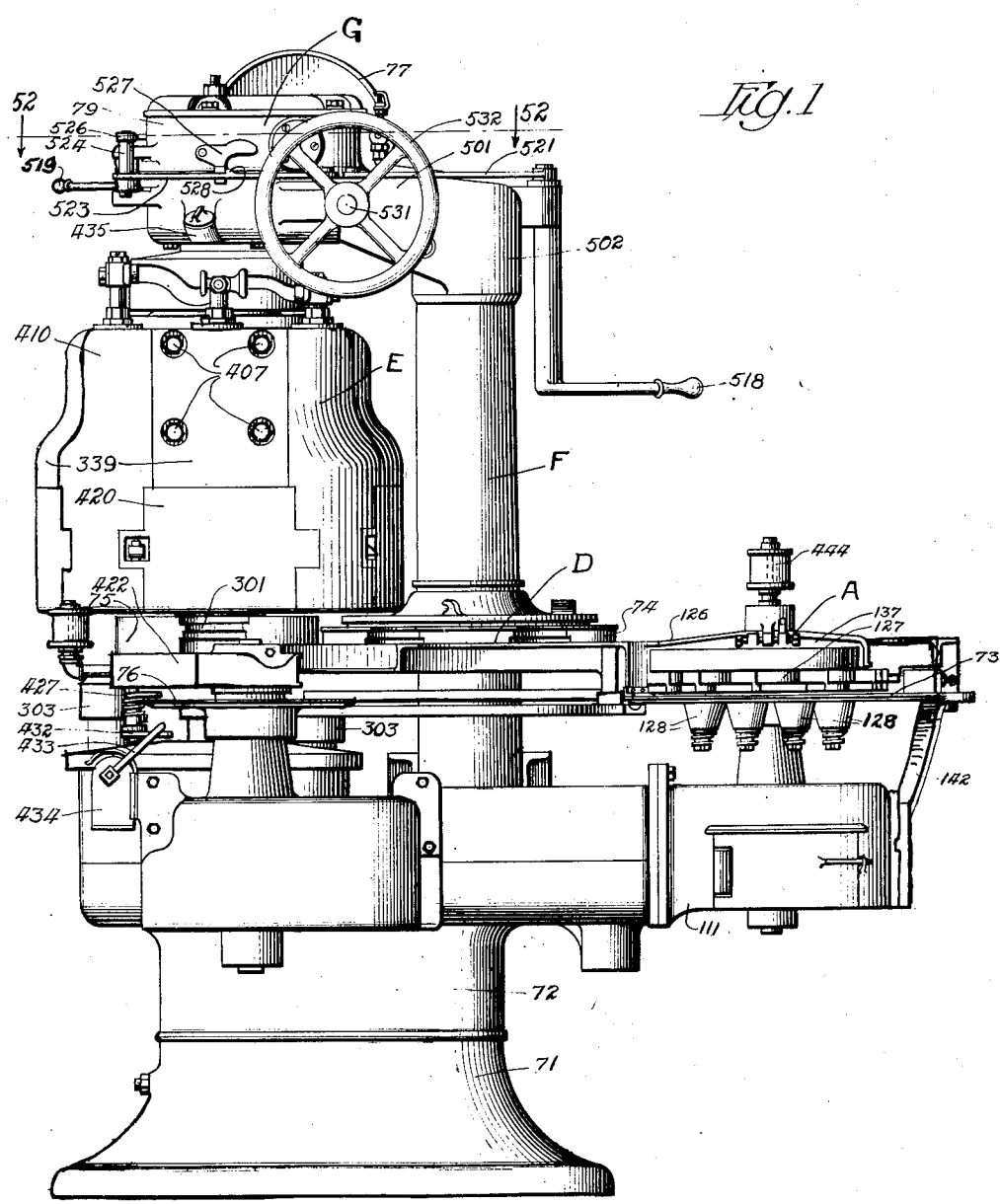
Figure 1 is a side elevation of an apparatus embodying the present invention.
Figure 9:
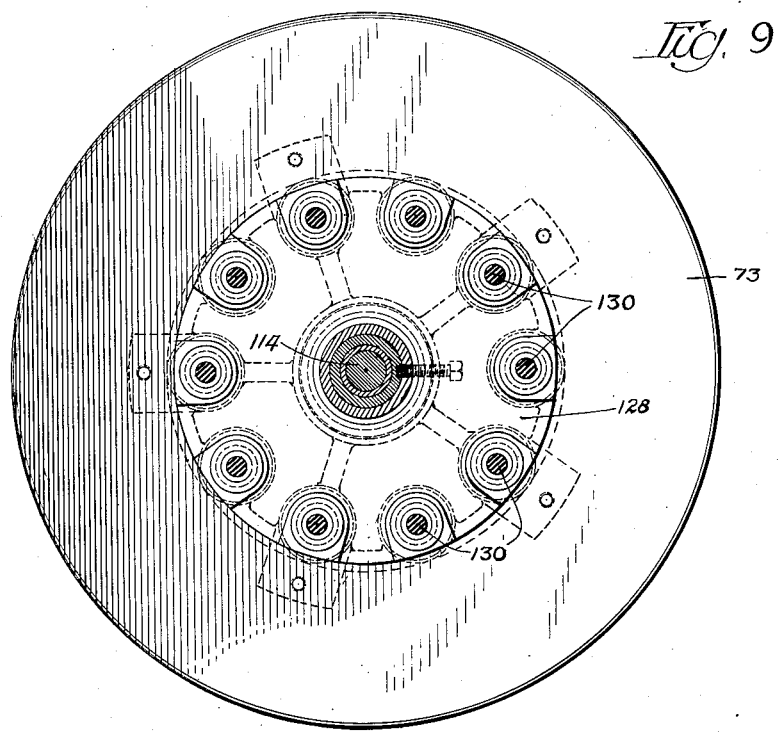
Fig. 9 is a section taken substantially on the line 9—9 of Fig. 7.
Figure 10:
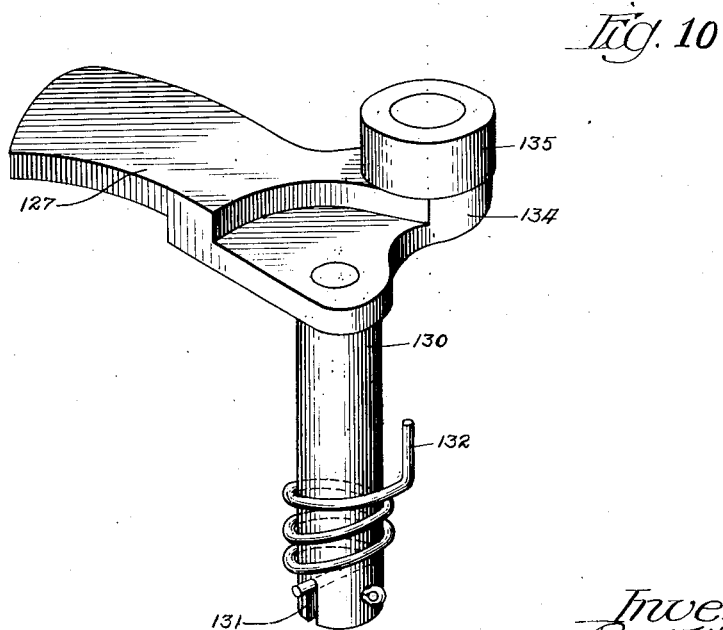
Fig. 10 is a detail perspective view of one of the can propelling fingers.
Figure 52:
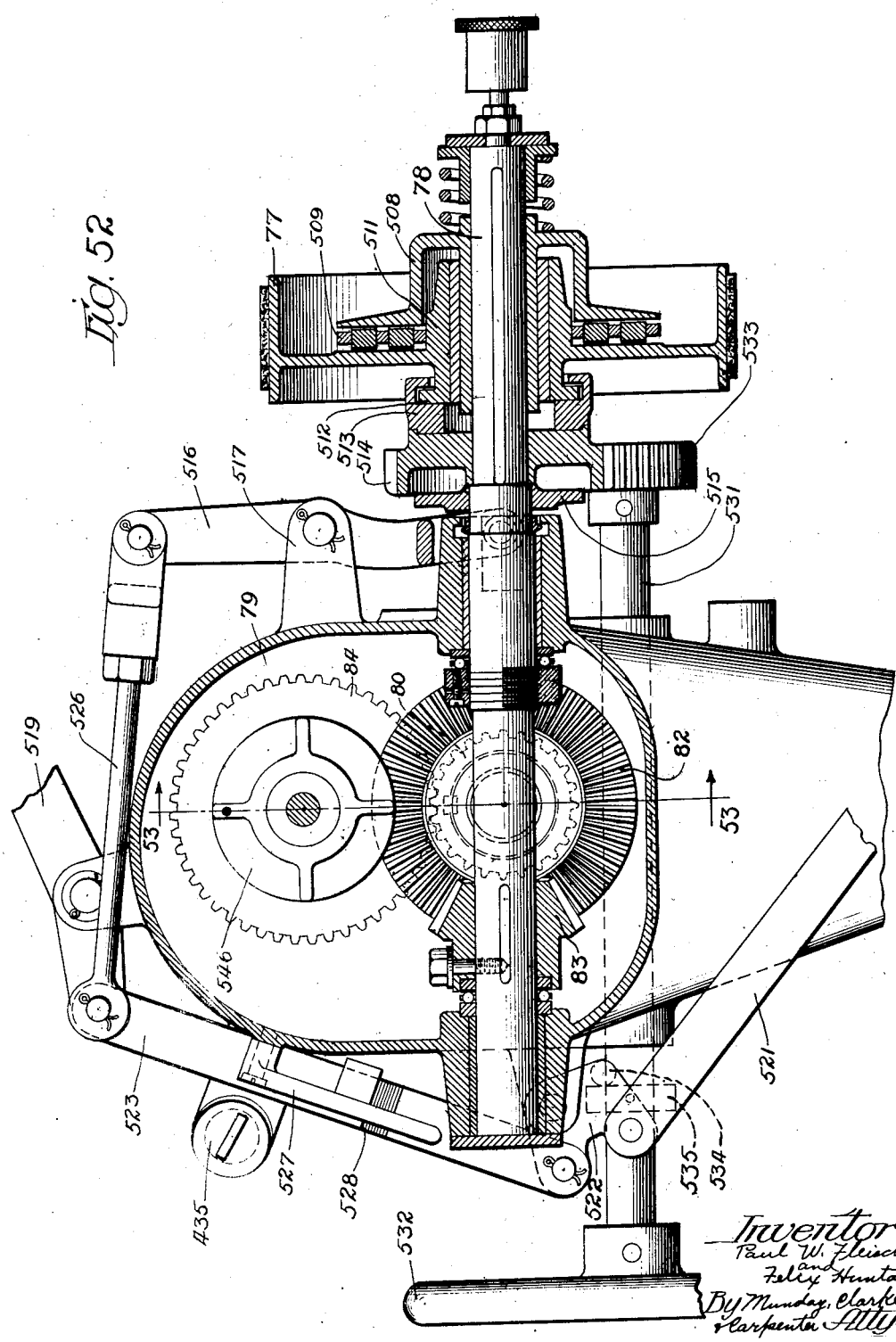
Figure 56:
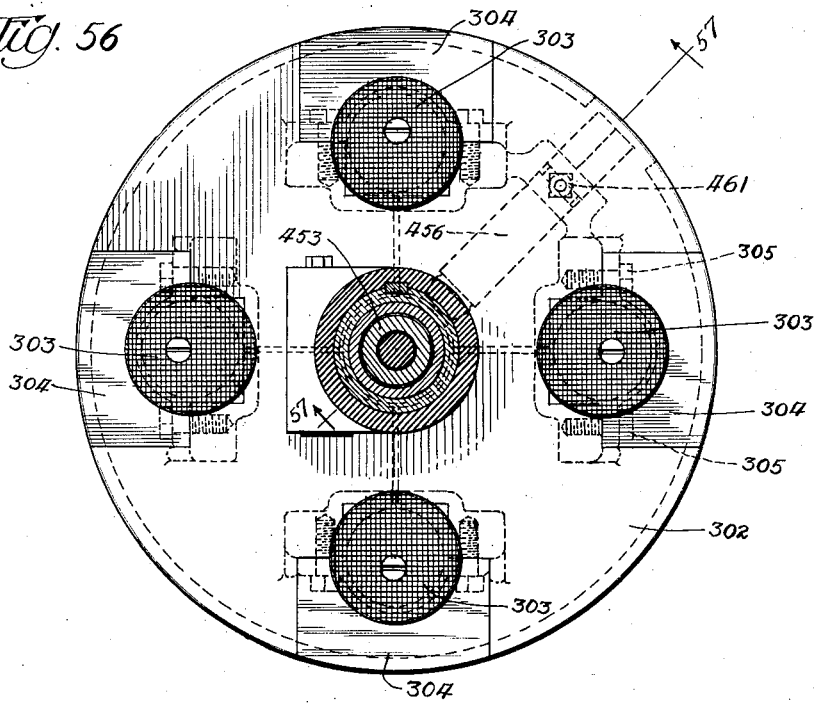
Figure 57:
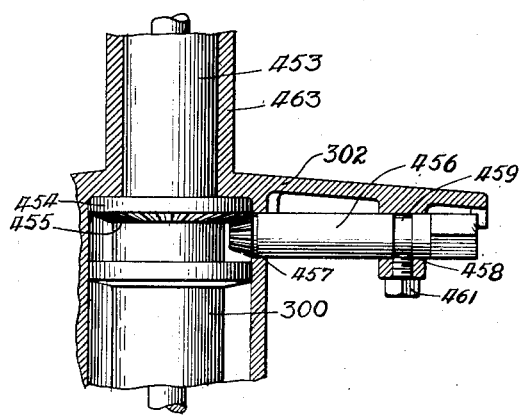
Figure 58:
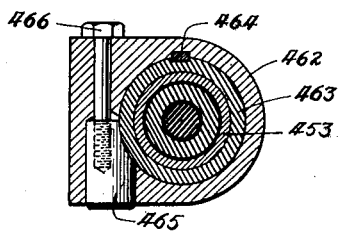

Figs. 38, 39 and 40 are sections taken substantially on line 38—38, 39—39 and 40—40 of Fig. 37;

Fig. 41 is a bottom plan view of a seaming head;

Fig. 42 is an enlarged partial perspective view of one of the roll adjusting sleeves and locks;

Fig. 43 is a perspective view of a roll pivot stud;

Fig. 44 is an enlarged section of a knockout roll stud bearing;

Figs. 45, 46 and 47 are sectional views illustrating the formation of a double seam;

Fig. 48 is a top plan view of a knock-out cam, parts of the turret being shown in section;

Fig. 49 is a development of this cam;

Fig. 50 is a vertical section taken substantially on the line 50—50 of Fig. 6;

Fig. 51 is an enlarged vertical section taken substantially on the line 51—51 of Fig. 4;

Fig. 52 is an enlarged section of the control mechanism taken substantially on the line 52—52 of Fig. 1;

Fig. 53 is a section taken substantially on the line 53—53 of Fig. 52;

Fig. 54 is a partial similar view shown in elevation instead of section;

Fig. 55 is a section taken substantially on the line 55—55 of Fig. 53;

Fig. 56 is a horizontal section through the seaming mechanism immediately above the can lift turret;

Fig. 57 is a section taken substantially on the line 57—57 of Fig. 56;

Fig. 58 is a section taken substantially on the line 58—58 of Fig. 5;

Fig. 59 is a section taken substantially on the line 59—59 of Fig. 53;

Fig. 60 is a detail of the can counting mechanism; and

Figure 61:
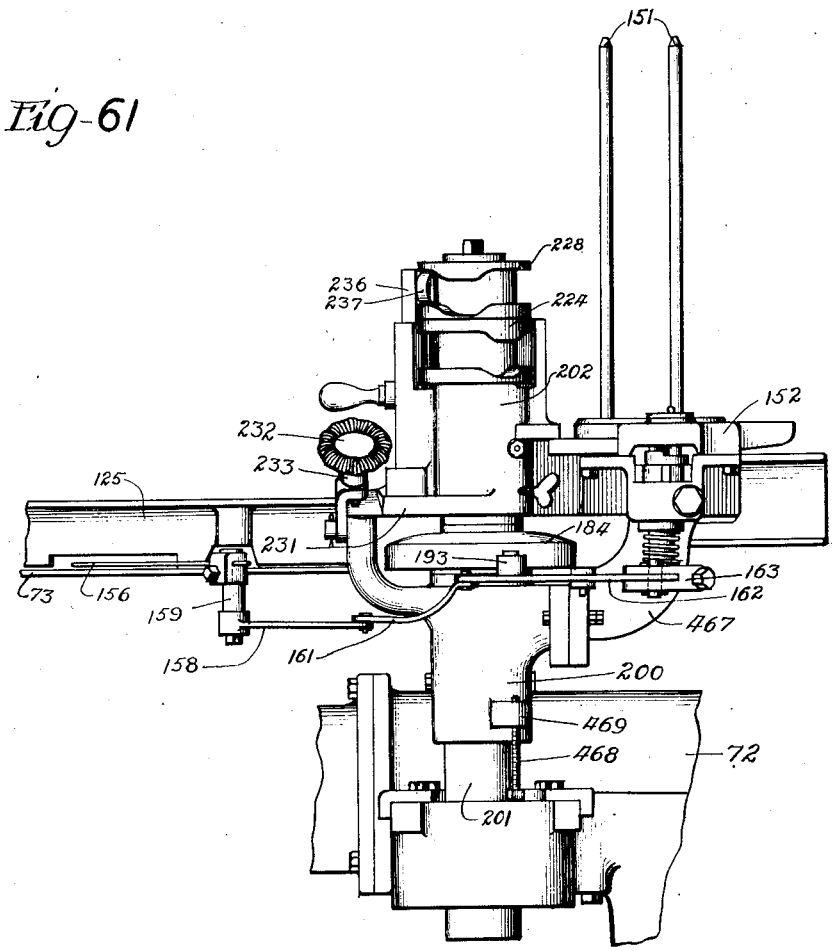

Fig. 61 is a fragmentary elevation taken from the rear of the apparatus.

For the purpose of illustrating our invention we have shown on the drawing a completely organized and commercial machine in which the invention in all its several features are embodied. It will be understood, however, that many of these features are capable of use in other connections and in machines having greatly different appearance and operation and that the parts are subject to considerable modification without departing from the spirit or scope of the inventive idea.

The machine in which the present invention is embodied is a double seamer and is adapted to form a seam like that developed in Figs. 45 to 47. Particular description of this is perhaps unnecessary except it should be mentioned that a can body 60 is flanged at its upper end 61 and receives a can head or end 62 having an outwardly extending flange 63 curled under at 64 and containing a gasket 65. The seam is formed in two portions—the first rolling the flanges together more or less loosely as shown in Fig. 46 at 66 (reference character 67 indicating the first operation roll) and the second operation roll (indicated at 68 in Fig. 47) flattens and tightens the seam as may be seen at 69.

The machine of the drawings is adapted to receive the cans in untimed arrangement; accurately time them as an incident to the initial feeding operation; feed the can ends from a stack when and only when cans are in the machine to receive the ends; to mark the ends as an incident to their delivery to the cans; to carry the two together rapidly and in continuously moving mechanism to a multiple-spindle seaming head or turret and to seam the ends onto the can bodies as they pass to the discharge station of the apparatus. At this station the seamed cans are accurately counted and discharged. The whole apparatus is compact and mounted upon a relatively small central base. The seaming turrets and associated mechanisms are supported in a frame and from an upright post located outside such turrets and mechanisms and this construction permits of a more compact machine with a smaller turret arrangement. It is believed that the description of the embodiment of the invention shown on the drawing and an understanding of the invention will be better facilitated by subdividing it into groups of associated parts and describing each group more or less separately.

General organization.

Referring first to Figs. 1–3 reference character 71 indicates the base of the machine. An intermediate casting 72 supports a can receiving and timing mechanism A; a can end feeding mechanism B; a marking mechanism C and a transfer mechanism D. The mechanism A is located at one end of the machine and the mechanisms B, C and D in what may be termed the central portion of the apparatus. On its opposite end it supports a can lift turret and associated parts of the seaming mechanism E. A post F extends up from the central part of the apparatus and this post provides the principal support for the driving mechanism G. Referring to Fig. 4, filled can bodies enter the apparatus at the point *a* and are timed in a feed turret while moving in the direction of the arrow *b*. From this they pass into the control of a transfer turret moving as indicated by the arrows *c*. The can ends meanwhile are fed from the can end feeding mechanism B in the direction of the arrow *d*. The cans travel on around to an assembling mechanism past which they move in the direction of the arrows *e* while the seaming occurs. They are then moved out to a discharge turret or disk, as indicated by the arrow *f*. The cans move continuously and without interruption from the point *a* to discharge from the apparatus and during this movement successively are subjected to the action of four continuously rotating disks or turrets, these disks being indicated in Fig. 4 as follows: Reference character 73 indicates the receiving disk, reference character 74 the transfer disk, reference character 75 the seaming turret, and reference character 76 the discharge disk.

Power is introduced into the apparatus through a pulley 77 mounted upon a shaft 78 (Fig. 3), this shaft having bearings in an upper gear housing 79 supported from the post F. Within the gear housing 79 is positioned a stub shaft 81 carrying a bevel gear or pinion 82 (Fig. 52) which meshes with a bevel gear or pinion 83 fixed on the shaft 78. The hub of the gear 82 is provided with gear teeth 80 (Fig. 3) which mesh with a gear or pinion 84 upon a sleeve 85 extending down through the center of the seaming mechanism. This sleeve carries at its bottom a pinion 86 meshing with a gear 87 upon a shaft 88 journaled at 89 in the frame member or casting 72. The shaft 88 extends through the frame 72 and is provided with a pinion 90 at its upper end which meshes with a large gear 91 which embraces the post F and is concentric with and drives the turret 74 (Fig. 3). The gear 91 meshes at one side with the gear 92 driving the seaming turret and with a pinion 93 which is an idler upon a shaft 94 in the frame. This idler meshes with a pinion 95 on the main shaft 96 of the marking devices and with the gear 97 upon an idle shaft 98, which shaft carries a pinion 99 engaged with the gear 101 on a sleeve 102 for driving the can receiving and timing disk (Fig. 6). The gear 91 also drives a gear 103 (Fig. 50) upon a shaft 104, this shaft having a pinion 105 meshing with the gear or pinion 106 upon the lower end of a shaft 107 of the discharge disk 76. The main can transferring parts of the apparatus thus roughly referred to are, as will be readily apparent, continuously driven and the numerous details of the driving mechanism will be hereinafter more particularly referred to in connection with the particular groups of mechanism affected.

Receiving and timing mechanism.

The mechanism for receiving and timing the can bodies is best disclosed in Figs. 2, 3, 4, and 7 to 10 inclusive. Referring first to Fig. 3, a frame extension 111 extends out to the right of the machine and this is provided with an elongated upwardly extending bearing sleeve 112. In registration with this sleeve a bearing frame 113 is provided. A stationary shaft or post 114 is keyed at 115 in the bearing bracket 113 and extends up through the sleeve 102 already referred to as connecting the gear 101 with the disk 73. A bearing sleeve of suitable anti-friction material 116 is positioned within the hub or sleeve 112 (as is perhaps best seen in Fig. 7). The connection between the gear 101 and the sleeve 102 is a friction one so that if the parts stick or become jammed in operation the friction drive may yield, thus preventing damage to the apparatus. This friction drive is accomplished by a friction member 117 interposed between the lower face of the gear and a collar 118 fixed on the sleeve but slidable lengthwise thereof. This collar is pressed up against the friction ring 117 by a spring 119 interposed between the flange 121 on the collar 118 and a two-part collar 122 threaded on to the lower end of the sleeve. This collar is adjustable and adapted to be locked in adjusted position by a screw 124 as will be readily apparent from Fig. 7.

The cans are received upon the disk 73 between an outer guide 125 and an inner guide 126 and are adapted to be arranged in timed relation and propelled in their advance by a plurality of fingers 127 which give them, toward the end of their movement, an acceleration into accurate timed relation with the linear movement of the transfer mechanism 74. Referring again to Fig. 7 the disk 73 has a separate central portion 128 having a plurality of downwardly extending bearing bosses 129 in which are mounted studs 130 normally held against rotation by springs 132 each having an end engaged in a slot 131 of the stud and the other end in a recess 133 in the boss. To the top of each stud 130 is pivoted a finger 127. Each finger 127 is provided with an inward and offset part 134 carrying a roller 135 engaging a cam groove 136 of a cam 137, as may be seen in plan in Fig. 8. This cam 137 is loose on the upper end of the post or shaft 114. The cam member is adjustable and is held in adjusted position by the guide 126 which is keyed at 140 to the upper end of the shaft or post 114. The adjustment is effected, as may be observed from Fig. 2, by two set screws 138 taking through lugs 139 extending up from the cam member 137 and engaging a central lug 141 on the guide hub of the guide 126. Referring now to Figs. 4 and 8, the guide 126 just referred to constitutes the inner guide in the direction of movement of the can and is thus supported in fixed position by the shaft 114 which is held against rotation, as has already been described, by the key 115 in the bracket arm 113. The outer guide 125, which is arranged substantially to provide a path of even width with the guide 126, is supported upon a bracket arm 142 at one end and from the main frame at the other in any suitable fashion. Referring to Fig. 4 it will be noted that just back of the point of delivery of the cans to the transfer mechanism the fingers 127 are spaced more widely apart than at other points in their travel. The lowermost finger of these two separated ones shown on the drawing moves forward at an accelerated speed to accelerate the can body just before and as it is delivered from the feeding and timing mechanism. This permits the can to be received at a relatively low speed and accelerated, with a predetermined action calculated to prevent spilling, to the speed of the transfer turret and the rest of the apparatus.

It will be noted that the cam track or groove 136 is widened somewhat at the point at which the cans are engaged by the fingers, this widening permitting the fingers to yield until the can is properly positioned so that damage to the cans under irregular contact with the fingers is prevented.

Can end feeding mechanism.

As has been stated this apparatus includes a no-can no-end feed control, that is to say, with no can presented to the transfer turret no end is fed. The can end feed is perhaps best shown in Figs. 4 and 12 to 18. The can ends are arranged in a stack holder formed of posts 151 extending up from a plate 152. The stack is supported on one side upon a shoulder block 153 fixed in the underside of the plate 152 and at the other side by a separator 154 (Fig. 14). This separator is adapted to release the lowermost can end so that this end, designated at 155 in this figure, may drop down to the position indicated. This separating and dropping down of the lowermost end occurs when and only when a can passes a given point on its way to receive the end thus dropped down. A finger 156 (Figs. 4 and 12) extends into the space between the guides 125 and 126. This finger is secured by a screw 157 or otherwise upon the end of a lever 158 pivoted at 159 in the guide 125. This lever in turn is connected by a link 161 with a link 162 which link in turn is connected with a fixed collar 163 (Figs. 12 and 14) upon the lower end of a short shaft 164 which, when oscillated, operates the separator 154. The shaft 164 is mounted in an eccentric bushing or sleeve 165 having adjustment lugs 166 on its upper end, these lugs being adapted to be rotated slightly to adjust the sleeve in its bearing 167, this adjustment permitting establishment of accurate relation between the active end feeding members and the stack of can ends. The bearing 167 is split at one side and a nut 170 may be tightened to lock the parts in adjusted relation.

The shaft 164 is provided with a head 168. This head is round and one half, 169, is somewhat higher than the other half, 171. Upon the two halves 169 and 171 are pivoted the two parts 172 and 173 of the separator 154. Fig. 18 shows the part 173 in perspective and it will be noted that this consists of a bifurcated finger having two bearing plates 174 at the front corners or ends. The forward parts of this finger are separated by a slot or depression 175 extending horizontally of the finger, and by a vertically extending slot 176. In Fig. 17 is shown a similar view of the part 172, which is a single elongated finger having a knife or separating edge 177 at its forward end, and a downwardly extending lug 178. The part 172 is adapted to rest in the slot 175 with the lug 178 in the slot part 176. Thus constructed and arranged as shown in Fig. 16, it will be manifest that oscillation of the head 168 will cause the separator parts to be alternately projected and retracted and that the edge 177 moves on a plane above the supports 174 a distance equal to the thickness of one can edge curl. In the action of the separator the stack normally rests on the part 173. Oscillation of the shaft 164 projects the separator knife edge 177 in between the flange of the bottommost can end and the one next above and at the same time the separator part 173 is retracted permitting the lowermost can end to drop at this side. The return reciprocation then lowers the end of the can edge next above upon the part 173 ready for subsequent delivery. A spring 179 is interposed between the center bushing 165 and clamp 163 to cause the bushing to turn with the shaft under normal operation and permitting slipping if the ends jam. A wearing plate 181 adjustable by bolts 182 is provided to take up the wear of the separator and to hold it in accurate position upon its support and guide 183.

The shaft 164 (Fig. 12) is caused to oscillate at the proper time from the shaft 96. Upon this shaft 96 is mounted a cam 184 having a cam groove 185 in which is provided a roll 186 upon a bell crank 187 pivoted at 188 on the frame. This bell crank is provided with a downwardly extending stud 189 normally movable in a slot part 191 in link 162. So long as the stud 189 is moving in the slot 191 under the cam action no feeding of a can end occurs. A lateral slot extension 192 communicates with the slot 191 and is adapted to provide a driving engagement with the stud 189 when a can body passes along the path of can movement and into position to receive the can end. In passing the arm 156 the can body swings the link 162 in a clockwise direction, viewing Fig. 12, establishing engagement between the stud 189 and the slot part extension 192. This causes a complete reciprocation of the separator causing a can end to drop down into the position shown in Fig. 14. A roller 193 is provided upon link 162 and engages the outer face of the cam 184. This cam is provided with cam projections 194 which return links 162 and 161, lever 158 and link 156 to normal inoperative position and prevent a second reciprocation of the can end separator.

As will be noted from Fig. 19, the can end stack holder formed of posts 151 is arranged above the transfer turret 74 and this turret is provided with a plurality of posts 195 which pass under the stack proper and which engage the tilted or dropped can end separated out by the separator. In the transfer turret are a number of can body end receiving pockets 196 each arranged just back of a post or lug 195 just mentioned. In the frame or plate member 152 are provided two straight tangential guideways 197, 198 along which the can end is moved by the advance of the post or lug 195 away from the axis of the turret and to the marking device. The movement of the can end continues along this guideway until the post or stud 195 is clear of the can end and the can end comes to rest. At this point it has entered a supplementary guide 199 at the outside. The can end thus brought to rest is in position for marking.

The marking position is indicated by the heavy dotted line, where the end is at rest during the period of time elapsing from the release of the end by the post 195, until it is engaged by the post 242. In Fig. 19, the post 242 has engaged the end and is moving it forward away from the marking station.

*The marking mechanism.*

The apparatus shown on the drawing and embodying the invention includes an improved and highly efficient device for marking any suitable index or insignia upon the can ends as they travel to the station at which the filled can bodies are received. This marking apparatus is shown in detail in Figs. 11, 13 and 19 to 25. The shaft 96 has a bearing at 201 in the frame and extends up through the normally stationary upper bearing 202, suitable bearing material 203 being employed, said bearing 202 being the body casting of the marker. The marking itself is done by appropriate members of the sets of dies in holders indicated on Fig. 11 by reference characters 204 and 205.

These dies and die holders will next be described and are shown in detail in Figs. 24 and 25. The die holders and dies are duplicates of each other and a description of one set will be adequate for an understanding of both. Each die holder consists of a back member 206 and a front member 207. The die holder parts are slotted at 208 to permit the dies to be inserted. A member of such set of dies is indicated at 209. Each back die holder member is provided with two outwardly projecting headed studs 211 adapted to extend through corresponding openings 212 in the front die holder member 207. Each die holder is adapted to contain in the present instance eight dies, each of which may be single or composite as desired. A spring 213 is provided through a lug 214 on the outer face of the outer die holder member 207 and the ends of this spring are adapted to engage beneath the edge of the studs 211 to hold the holder and dies in assembled relation. This arrangement permits easy substitution of dies in the holder, it only being necessary to spring back the ends of the spring and lift the outer die member off or away from the inner when the dies may be slid into position in their confining slots.

When it is desired to change or in any manner alter the setting or arrangement of the dies 209 in the slots 208 of the die holders 206 or 207, it will prevent unintentional displacement of the die sets 209 when the cover 207 is removed, if the entire die heads be removed and laid or held flatwise during this manipulation.

The lower die holder, which is the one indicated in Fig. 11 by reference character 204, is fixed during the marking operation and is positioned upon a boss or projecting member 215. A shaft 216 enters an aperture in this boss and the set screw 217 is provided to lock it in place (Fig. 26). The set screw 217 enters a recess 218 in the stud, the face back of the recess being beveled to permit the set screw to draw the die holder tightly into position.

The upper die holder 205 is mounted in a vertical slide 219 (Figs. 11 and 22). At the bottom part this slide is provided with a plate 221 adapted to enter into the back of the die holder 205 and to be held in engagement therewith by a knurled set nut 222 on the end of a post 223, which is fast in the slide itself. The upper die 205 is caused to reciprocate by a cam 224 on the shaft 96 which cam engages a cam roller 225 fast upon a stud shaft 226 in the upper end of the slide 219. This cam causes the die to raise and lower during the rotation of the shaft. In the present instance means are provided to permit this cam action to be a somewhat yielding one to accommodate the die marking to ends of different thickness without damaging the ends or placing undue strain upon the machine. A spring 227 is positioned above the cam 224 and beneath a head 228 fast on the end of the shaft. As will be later explained this head forms a part of a cam for the movable can end stop.

The entire marking apparatus may be swung about the shaft because the bearing 202 may be rendered rotatable with respect thereto. Viewing Fig. 4 it will be noted that an arm 231 extends out from the bearing sleeve or part 202 and normally is engaged with a lock 232 extending up from a pivot 233. When this lock is unlocked the die mechanism may be swung from operative position to one permitting ready adjustment or change of the dies. Any one of the several sets of dies may be brought into operating position by merely loosening the set screw 217 and the knurled knob 222 and turning the die holders when thus released to desired altered position.

Means are provided in the machine shown on the drawing for bringing the can ends to rest in accurate position at the die marking station. This means consists of a finger 234 (Fig. 22) upon an arm 235, which in turn is fast on a rod 236. This rod slides in the bearing part 202 and carries a roller 237 at its upper end. The roller 237 operates in a cam groove 238 in the head 228 already described. The finger 234 therefore moves up and down with the rotation of the shaft and comes into position to engage the forward edge of the can end when it arrives in accurate position at the marking station. After the marking operation the downward movement of the slide lowers the finger 234 and permits the can end to proceed through the machine. The entire marking apparatus may be raised and lowered as occasion may require and permit operation of the machine upon cans of different height by a telescoping connection between the two parts of the bearing 201 as will be later described.

*Can end and body transfer.*

While the marking occurs the can end is at rest and in the present instance the upper marking die has a straight line reciprocation or action. The transfer turret, however, rotates continuously and this marking is accomplished by the time the can pocket, immediately behind the end, arrives at the marking station, it being remembered that the can end was deposited slightly in advance thereof. The can end rests at the marking station until a shoulder 242, extending up from the rear outer end of the pocket plate 243 (Fig. 19), i. e. the plate located at the top of each pocket 196 of the turret 74, engages the can end. This shoulder is arranged outwardly radially further than the shoulder 195 previously described. The engagement is perhaps best shown in Fig. 19 from which it will be noted that the guide 199 curves back in toward the transfer turret at 245 to cause the can end to sweep into the pocket. A stud 246, shown in perspective in Figs. 22 and 23, extends down beneath the plate or member 152. This stud is cut away at 246 to permit the shoulder 195 to pass behind it and the shoulder 242 in front of it. The stud is provided with a groove 247 at its forward side in which the edge of the can end may rest as it is guided into the transfer turret pocket. This groove is spiraled downwardly so that it guides the edge of the end into its final position in the pocket.

Referring now to Figs. 20 and 21 it may be mentioned that a lip 248 is provided in a block 249 to extend up from the rear or inner part of the transfer pocket member 243. The can end enters beneath a top or stationary plate 251 and a part of this plate is cut away at 252 (Fig. 29) to permit the curl of the can end to engage over the lip 248. The distance between the top plate 251 and the transfer pocket member 243 decreases and the can end is firmly grasped between these parts resting only in addition upon ledges 250 and 253 at the outer ends of the pocket member. Plate 251 is a mere gravity plate surrounding the post F and has hand holes or grips 254 by which it may be lifted to permit removal of the can end at any point in its travel before it reaches the seaming station. Referring now to Fig. 4, it may be mentioned that the can body is fed into the pocket beneath its companion end and the two move together in accordance with the arrows c—d, the can body moving against a guide 255 to the seaming station. A bottom plate 256 is provided having an outlet 257 and an upstanding flange 258 to catch any spillage, although in the usual operation of the machine it will be found that such spillage is of negligible amount and is generally entirely absent.

*Seaming mechanism.*

As has been stated, the present apparatus is a multi-spindle machine employing four spindles, i. e. four complete seaming mechanisms. These are mounted in a single organization and rotate continuously about its axis. The filled can bodies and the ends are received automatically as they are delivered. The seaming mechanism comprises a constantly rotating turret 75 (Fig. 4), the pockets of which mate successively with the pockets of the transfer turret 74. These pockets are so dimensioned and arranged that this mating action, transitory though it be, causes accurate rounding of the can body and during this rounding the body and cover are clamped for the seaming action and thus clamped are carried throughout a portion of the revolution about the center of the seaming mechanism organization and in this portion of the revolution have the first and second seaming operations performed upon them. The apparatus includes four can lifts arranged in axial alinement with the pockets 301 of the seaming turret and moving continuously therewith. Referring to Figs. 3 and 6 it will be noted that the gear 92, the drive of which has already been described under the division of this specification relating to the general power organization, is attached to a hub member 300 (Fig. 5) which forms a part of the body 302 carrying the can lifts 303. Each can lifting mechanism consists of a single unit having bearing in a plate 304 attachable by screws 305 into its pocket in the body 302. Each can lift with its associated mechanism may thus be removed and positioned as single units. The lift itself comprises a serrated plate 306 fixed upon a body 307 from which a stem 308 extends down into a threaded block 309 (Fig. 31). This threaded block is in engagement with a sleeve member 311 open and unthreaded at its top. Within this top an enlarged part 312 of the plunger moves and the sleeve member contains a spring 313 positioned between the plunger body and the block. The lifting action is upon the sleeve member 311 and the spring 313 is provided to take care of variation of can dimension and height without danger of damage to the machine. The sleeve extends through an upper boss 314 on the bearing plate 304 and through a lower boss 315. A slide 316 prevents turning of the sleeve in the lower boss and through this slide through the sleeve and through the lower end of the plunger rod 308, a pin 317 is positioned. This pin is smaller than the opening in which it rests and permits limited spring action of the spring 313.

A cam member 318 comprising a lifting cam 319 is arranged beneath the movement of lift travel and engages a cam roller 321 upon a shaft 322 extending through the lower end of the sleeve. This shaft carries a second roller 323 engaging a second cam part 324 (for lowering). Means are provided to produce nice adjustment of the cam rollers 321 with respect to their cam 319. A shaft part 325 on which a roller 321 is mounted is eccentric as may be noticed from Fig. 31. The shaft has concentric bearing at 326 and 327 in the sleeve member 311. A second shaft part 328 on which the roller 323 is mounted is concentric with shaft part 325. Rotation of the shaft itself in its bearings will move the axis of rotation of its roller 321 to take up for wear and permit adjustment. Fig. 33 shows a development of the cam and from this it will be noted that the can is lifted first pronouncedly at the point 329 and then slightly additionally further at the point 331. This brings the can head up against the chuck first at the clamping station and then gives it a slight additional pressure later on in the travel. A screw set 332 is provided for holding the cam shaft 322 in adjusted position.

Four seaming heads, including four sets of seaming rolls, are provided, one seaming head and its rolls being associated with and arranged directly above each can lift. The can being lifted first engages a knockout plunger 333 having a head 334 (Fig. 37). The body of the plunger consists of a rod which extends up through a post or sleeve 335. This post or sleeve 335 at its upper end is threadedly engaged at 336 with a supporting sleeve member 337 threadedly engaged with a bushing 338 in a housing 339 of the seaming head unit and in the support for the said unit. The seaming head and its rolls, knockout and other associated parts are all mounted in the casing 339 so that the whole unit completely assembled may be removed for adjustment, repair, cleaning and other purposes as will be later described.

The post or sleeve 335 is provided with an internal central bore 341 extending down from its top a considerable distance and this bore is of larger diameter than the plunger. It is surrounded by a collar 342 and between this collar and an upper sleeve 343 is positioned a spring 344. The upper end 345 of the plunger rod or body 333 extends through a head 346 on the end of the sleeve 343 and is held in place thereon by a nut 347. A short cross shaft 348 extends through this head and through a slot 349 in the rod 333. This shaft carries a roll 351 working in a cam groove 352 in a cam 353 supported at 354 in the main part of the housing casing and held against rotation by a key 350' engaging a sleeve 350 depending from gear housing 79, so that the cam is held against rotation throughout the action (Figs. 3, 36 and 53).

When the can lift raises a can, the can moves into engagement with the can end lifting it against the knockout head 334, which knockout head is moving down at this time to effect this engagement. Further movement of the lift causes some compression of the spring 344. Further movement of the lift is accompanied by upward movement of the plunger head until the parts come to normal seaming condition at which time the can is located against a chuck 356, which will be presently described. The plate 251 is cut away at the can lift station as indicated at 355 in Fig. 30 to permit the can end to be moved up into engagement with the chuck. The chuck 356 is carried in threaded engagement upon the lower end 357 of the sleeve or post 335, this post being held against rotation by the threads at 336, already mentioned.

Means are provided for causing rotation of the seaming rolls against the can seam parts and for moving said rolls into and out of action. The seaming head comprises a body 361. This seaming head or body is carried upon the lower end of a sleeve 340 extending through the head at 362, a locking nut 363 being provided to hold the parts together. The sleeve extends up within an outer sleeve 364 which forms a confining bearing for it and into a gear or pinion 365, a locking nut 366 being provided to hold the gear fixed upon the sleeve 340. The gear 365 meshes with the gear 367 upon the driving sleeve 85, already described. The driving mechanism thus provided causes the head 361 to rotate continuously and during its rotation two pairs of seaming rolls are brought alternately into action to accomplish the seaming operation. Referring to Fig. 37 a set of two such rolls is shown in section. These rolls are mounted on roll spindles or shafts 369 eccentrically positioned in larger shafts 371 carried in bushings 372, 373 in vertical openings through the head 361. At each side of the head the body is extended down at 360 and plates 370 held by screws 380 hold the rolls on the spindles. The rolls are brought in and out of operation by relatively slow rotation of the larger shafts 371. Each of these shafts is provided with gear teeth 374 about its periphery which mesh with a central gear 375 connected to the lower end of sleeve 364 at 376. The sleeve 364 is formed into a gear 377 at its upper end, which meshes with a gear 378 upon drive sleeve 85. One or more bolts 379 are positioned through gears 367 and 378 to insure their joint rotation. The diameters of gears 365 and 377 are slightly different so that slightly different rotation is provided between gear 375 and the seaming head. This difference in movement is just sufficient to cause the first operation rolls to be moved into communication with the can seam to perform the first seaming operation and thereafter to cause the second operation rolls to move into and subsequently out of action, all this happening while the seaming head itself is rotating rapidly with the operating rolls in contact with the seam and between the points of receiving the can and discharging it after seaming. Anti-friction thrust bearings 381 are provided between a sleeve or housing 382 and a shoulder 383 on sleeve 364. This housing 382 is threadedly supported at 384 from a flange sleeve or collar 385 engaging a main part of the seaming head unit casing 339 at 386 and a cooperating part of the seaming mechanism at 387. An anti-friction thrust collar 388 is provided beneath the gear body 365 and within the gear 377.

Adjustment between the chuck and rolls may be accomplished by turning the housing member 382 with respect to the collar 385, lugs 389 being provided to facilitate this turning movement. A block comprising a lock 391 carried on the end of a bolt 392 is provided to engage beneath a flange 393 on the housing 382 after the parts have been adjusted, screwing up of the bolt 392 binding the parts together.

Means are provided to permit of the ready accurate adjustment of the seaming rolls into desired position. Viewing Fig. 37 it will be noted that the lower end 394 of each spindle is eccentric with respect to the body. A detail of such spindle is shown in Fig. 43 from which it will be noted that an arm 395 extends out from the top, this arm being located above the shaft 371 and adapted to engage in one of two slots 396 in the bushing or upper collar 373. This bushing is provided throughout a part of its cylindrical surface with gear threads 397 (Fig. 39) which engage gear teeth 398 upon a radially arranged pin 399 rotatably held in the head by a pin 401. The arm 395 is placed in one or the other of slots 396. When in one of these slots the seaming roll is in operative position and when in the other it is withdrawn so it does not move into contact with the seam. The operative position may be slightly altered and adjusted by the turning of the spindle about its own axis by rotation of the bushing or sleeve 373. Withdrawal of the seaming roll to inoperative position as suggested above does not destroy this adjustment and it may be returned to the same adjusted position by replacing the arm 395 in the operative slot 396. The arm is held in either slot by a spring 402 resting in a recess 403 and having a finger piece 404 to permit its removal. This construction permits temporary removal of the roll and spindle from operative position without at all disturbing any adjustment of the seaming head. Retaining plates 405 are preferably provided and held in place by bolts 406 to hold the collars or bushings 373 in position. It will be understood, of course, that two companion rolls, co-operating in each operation, i. e. the two first-operation rolls and the two second operation rolls are arranged upon eccentric ends 394 of the main roll spindles or shafts 369 and are alternately brought into action by the mechanism described.

After the second operation rolls have continued their action the knockout 333, 334 is lowered to force the closed can away from the chuck and at the same time the can lift moves back to normal position. The cans are then seamed and ready to be discharged from the machine.

Means are provided for indicating the progress of the seaming action as each can is seamed. This may be observed from Fig. 48. As will be readily understood upon examination of the drawing the knockout cam 353 is stationary. On it are suitable indications 400 showing the points at which the first operation starts and finishes, the points at which the second operation starts and finishes and the zero or discharge point. The upper end 345 of the knockout rod in passing these points indicates the progress made in the seaming, i. e. when the end of the rod is opposite the point "2 start" it is indicated that the second operation is about to begin.

This visual indication of the progress of the machine enables the operator to know at which point to stop the machine should he desire to inspect it in partially finished condition. It also provides means for returning any seaming unit in accurate timed relation with the rest of the apparatus, this being accomplished by stopping the apparatus at a point indicated, as for example "start" or "zero", taking out the unit and replacing it with a pointer indicating the same mark.

As has been stated, each seaming head is a complete unit that may be readily bodily removed from the apparatus. The parts that thus come away are the individual casing part 339 and all the parts surrounding the knockout rod. This casing part fits into the main casing 410, being held in place by bolts 407. Viewing Figs. 36 and 37 this separation occurs along the axis of the knockout rod and bearing part 387, which co-operates with bearing part 386 and forms a part of the main casing 410. The bushing 338 has bearing also at 339' in the main casing at 410. Viewing Fig. 1 it will be noted that the individual seaming casing 339 is held in place by bolts 407 which, when released, permit the unit to be bodily removed. Individual casing part 339 extends down part way of the main casing, the space therebeneath being closed by a door 420, which must be opened to permit removal of the units and which may be opened to permit access to the seaming recess without removal of the units.

*The discharging and counting mechanism.*

Referring to Fig. 4 the cans after seaming are engaged by a guide 421 and carried between it and a second guide 422 (Fig. 4) onto the rotating disk 76. The guide 421 is a continuation of the guide 255 and extends in beneath the seaming turret 75. The guide 422 is carried upon the upper end of a stationary shaft 107 fast in a lower bracket 425 (Fig. 50), which is part of the casing 72. About this shaft is mounted a sleeve 426 upon which is secured the gear 106 already described. At the upper end of the sleeve 426 the disk 76 is fastened by a key 423 and set screw 430. The guide 422 in the present instance comprises a casing extending back along the path of travel from the shaft 107. An arm 427 is pivoted behind the guide being formed as a part of a downwardly extending sleeve 428 mounted on a stud 429 engaged in the guide. This finger extends across the path of can movement and is adapted to be moved out of the path by each can in passing. A spring 431 normally holds the finger in can engaging position. The sleeve 428 carries an arm 432 adapted to engage an arm 433 on a can counter 434 of any usual or preferred type.

*The oiling system.*

In the apparatus shown on the drawing a centralized oiling system is employed. Oil is introduced in bulk into the gear casing 79 through a receiving spout 435 (Fig. 1). Herein the oil is lifted by the splash of the gears and thrown into a trough 436 disposed about a part of the top of the casing. From here the oil flows through a sight guage 437 and pipe 438 to the upper inside surface of the column F. The oil runs along the inside of this column until collected by an inside ledge or shoulder 439 (Figs. 3 and 5) which causes it to pass through an opening 441 to a bushing 442 located within the cylinder or sleeve 443 which forms a driving connection between the gear 91 and the transfer turret 75. The oil within the gear casing 79 seeps slowly down within the gear 84, past anti-friction or ball bearings 475, past a bushing 476 about the power sleeve 85 and on down along this power sleeve to the lower end. It also passes in and about the gears 365, 367, 377 and 378 lubricating them as well.

In passing down along the driving sleeve 85 it seeps out radially through lateral bores 477 to the lifting mechanism and passing farther down lubricates the gears in the main and lower gear casing 478. A bleed 479 supplies oil to the gears 86 and 87. An oil cup 444 is arranged on the post 114 and supplies oil to the parts immediately therebeneath. It will be apparent therefore that most of the machine and particularly the parts requiring the greatest amount of oil are lubricated automatically.

*Adjustment for cans of different height.*

The apparatus shown on the drawings is adapted with a few simple changes to operate on cans of different height. In this adjustment the entire seaming head mechanism is raised or lowered along its central axis but the floor level of the can travel is fixed. The timing turret 137 is not changed in its adjustment. Indeed no adjustment of the timing apparatus is necessary, the cans merely extending up farther when higher cans are fed and no adjustment is necessary of the discharging and counting mechanism. In arranging the apparatus for cans of different height the transfer turret is removed and another of approximate thickness substituted. That is to say, a turret is provided to bring the pockets for the can ends at the right height with respect to the pockets of the can body. This is easily accomplished by removing the plate 251 which is in two parts, which may be seen from Fig. 5, and then removing the bolts 445 fixing the turret to the sleeve 443. The turret being in halves may be thus also removed.

The entire seaming mechanism, including the seaming turret, may be bodily lifted and adjusted. This is accomplished by the mechanism shown best in Figs. 3, 5, 36 and 56 to 58. Referring to Fig. 3, it will be noted that the entire seaming mechanism is supported upon and carried by a central sleeve 451 which is threadedly engaged at 452 with a lower supporting sleeve 453, this sleeve terminating at its bottom in a flange 454 carrying a beveled gear 455. A shaft 456 is positioned through bearings 457 and 458 in the underside of the lift turret 302. The shaft 456 is provided with a slot 459 in which rests a set screw 461 to hold the shaft against lengthwise movement. Turning movement of the shaft will rotate the lower sleeve 453 and cause raising or lowering of the entire seaming mechanism and driving parts for the same together with the pocket seaming turret. Figure 58 shows a mechanism for clamping the seaming turret in adjusted relation. The sleeve 451 (Fig. 3) is provided with a downwardly extending collar 462 which embraces an upwardly extending flange 463 of the member 302, this flange being disposed about the lower sleeve 453. A feather 464 prevents independent rotation of the seaming mechanism and the lifting mechanism while permitting relative axial movement therebetween. A plug 465 is mounted in the collar 462 and adapted to be drawn tight against the outer face of the flange 463 by a bolt 466 for locking the parts in adjusted relation.

The marking and can end feeding apparatus may be raised and lowered as a feature of this adjustment. The can end feed plate 152 on bracket 183 is supported from an arm 467 from the sleeve part 200 of adjustable sleeve 201 (Fig. 61). This raises or lowers both the marking mechanism and the can end feeding devices and the parts may be locked in the assumed adjusted relation by means of the block 239 and bolt 241 (Fig. 13). This adjustment may conveniently be accomplished by a bolt 468 in a boss 469 on sleeve part 200 and engaging at its lower end the intermediate casting 72.

The gear casing is carried from the post F (Figs. 53 to 59) and an arm 501 extends out from the gear casing and is provided with a cap or head 502 fitting over the upper end 503 of the post F. A pocket 504 is provided within the head 502 and a block 505 is positioned in this pocket to bear against the outer face of the embraced portion of the post. A bolt 506 is provided to tighten the block into locking position, a key 507 engaging the upper end of the post and the head 502 prevents rotation of the parts.

*Control and safety features of the apparatus.*

The pulley 77 is adapted for clutch connection with the shaft 78. Referring to Figs. 2 and 52 a clutch is provided including a member 508 slidable on the end of the shaft but rotatable therewith and a clutching member or collar 509. The hub 511 of the pulley is provided with a flange 512 embraced by a collar 513. This collar is carried on a gear 514, the purpose of which will be presently explained. A cooperating disk 515 is adapted for engagement by a clutch lever 516. This lever is pivoted in a bearing bracket 517. The machine includes two operating levers indicated respectively at 518 and 519 in Fig. 2. One of these (518) is accessible from the feeding-in end of the machine and the other (519) from the delivering end. The lever 518 is connected by a link 521 with a pivoted plate 522, which in turn is connected by link 523 with lever 519. The pivot 524 connecting the lever 519 with the link 523 forms also a pivotal connection between these parts and a link 526 in turn pivoted to the clutch lever 516. It will be thus apparent that either lever 518 or 519 will, upon manipulation, disconnect and connect said clutch. A latching mechanism is provided to prevent connection of the clutch except by deliberate intention. This latch is indicated by reference character 527 (Fig. 1), pivoted on the upper gear housing and adapted to drop behind a ratchet tooth 528 on link 523.

Means are provided also for turning the machine over by hand, which means includes a shaft 531 (Fig. 52) journalled in the gear housing and having a hand wheel 532 at one end and a pinion 533 at the other. This shaft is slidable lengthwise in its bearings to move the pinion into and out of gear relation with gear 514, already described. Means are also included for preventing interengagement of this pinion and gear except when the clutch is disconnected. A stud 534 is provided upon the underside of the pivoted plate 522 and a collar 535 is fast upon the shaft. The relations of these parts is such that when the linkage is in the position it must take with the clutch disconnected and the latch in locking position the stud 534 permits movement of the shaft into the position shown in Fig. 52. When the links are moved to start the apparatus the stud acting upon the collar automatically disengages the gear and pinion and holds it out of engagement until the clutch is again disconnected when it may again be connected as just described, if desired.

Arrangement is made for automatic disconnection of the power from the rest of the apparatus should any part of it become jammed. Referring to Figs. 54 and 55 it will be noted that the yielding connection is provided between pinion 84 and sleeve 85, which connection will now be described. The sleeve is provided with a part substantially square in cross-section with its upper end at 541 and upon this sleeve portion is slidably mounted a mating collar 542. This collar has a slight stepped engagement as indicated at 543 (Fig. 54) with a surfacing member 544 on the top of the gear 84. A lock collar 546 is threaded on the upper end of the sleeve and forms an upper bearing for a spring 547 pressing upon the collar 542 and holding the parts in driving relation. The step connection is such that it may be broken when undue resistance is encountered to the power movement permitting slipping. The spring may be adjusted as part pressure exerted by movement to the collar 546.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:—

1. In a multi-spindle double seamer for seaming can ends to filled can bodies, the combination of a turret, a head, said head and turret having a plurality of can clamping devices, a double seaming mechanism arranged in co-operation with each said clamping device, a rotating transfer means located adjacent said turret and head for automatically delivering cans thereon, and a support for said turret and head arranged concentric with said transfer mechanism.

2. In a multi-spindle double seamer for uniting can ends to filled can bodies, the combination of, a support comprising a base, an upwardly extending column, a transfer turret rotatable about said column, and a rotatable seaming turret and seaming head mechanism supported from said base and column and located at a side of said transfer turret.

3. In a double seamer for uniting can ends to filled can bodies, the combination of, a seaming mechanism, and a rotatable turret for delivering cans and ends to said seaming mechanism, said turret comprising a body and pressure member adapted to support the can end above the can by engagement with a restricted portion at the top side thereof.

4. In a double seamer for uniting can ends to filled can bodies, the combination of, a seaming mechanism, and a rotatable turret for delivering cans and ends to said seaming mechanism, said turret comprising a body and pressure member adapted to support the can end above the can by engagement with a restricted portion at the top side thereof, said pressure member being adapted to be lifted throughout at any point in its travel to permit removal of the can end.

5. In a double seamer for uniting can ends to filled can bodies, the combination of, a seaming mechanism, and a rotatable turret for delivering cans and ends to said seaming mechanism, said turret comprising a body having a can pocket and an end receiving pocket, said end receiving pocket being provided with an upwardly extending part adapted to enter upon the flange of the end, and a pressure member yieldingly pressing upon the material of the end at the inside of said pocket.

6. In a double seamer for uniting can ends to filled can bodies, the combination of, a seaming mechanism, and a rotatable turret for delivering cans and ends to said seaming mechanism, said turret supporting said end by one edge above the can during rotation of the turret in feeding and with the end substantially entirely exposed to view.

7. In a machine for uniting can ends to filled can bodies, a marking mechanism comprising in combination, marking male and female dies having relative cam actuated approach and retreat in the marking operation, said cam being yieldable to permit yielding action of said die from its companion to compensate for variation in the thickness of the can ends.

8. In a machine for uniting can ends to filled can bodies, a marking mechanism comprising in combination, die holders for holding a plurality of sets of marking dies, said die holders being conjointly swingable from operating position, and said marking dies being readily interchangeable in marking position.

9. In a machine for uniting can ends to filled can bodies, a marking mechanism comprising in combination, die holders having a plurality of readily arranged marking dies, said die holders being bodily swingable from operating position and having screw holding means readily releasable to permit substitution of marking dies.

10. In a multi-spindle double seamer for uniting can ends to filled can bodies, the combination of a rotatable seaming head carrier, and seaming heads comprising chuck, knock-out, and seaming roll mechanisms, each said seaming head constituting a unit readily removable bodily from said seaming head carrier.

11. In a multi-spindle double seamer for uniting can ends to filled can bodies, the combination of a rotatable seaming head carrier, a plurality of seaming heads carried thereby and each comprising a chuck held against rotation independently of the carrier, seaming mechanism movable about a can held against said chuck, said seaming head mechanism being bodily removable as a unit.

12. In a multi-spindle double seamer for uniting can ends to filled can bodies, the combination of a rotatable seaming head carrier, a plurality of seaming heads and a plurality of can lifting mechanisms, each said can lifting mechanism constituting an individually removable unit.

13. In a multi-spindle double seamer for uniting can ends to filled can bodies, the combination of a rotatable seaming head carrier, a plurality of seaming heads, a plurality of can lifting mechanisms necessary for lifting the can and holding it against independent rotation, each said lifting mechanism constituting a readily removable unit.

14. In a multi-spindle, continuously rotating double seamer for uniting can ends to filled can bodies, the combination of a plurality of can holding and seaming mechanisms rotatable about a common central axis and performing as an incident to their rotation first and second seaming operations, and end rotatable means for indicating accurately the position at which said seaming is accomplished.

15. In a multi-spindle, continuously rotating double seamer for uniting can ends to filled can bodies, the combination of a plurality of can holding and seaming mechanisms rotatable about a common central axis and performing as an incident to their rotation first and second seaming operations, and end rotatable means indicating by the relative position between it and said rotating seaming mechanism the progress of the formation of the successive seams.

16. In a double seamer for uniting cans to filled can bodies, the combination of a seaming head, a chuck for engaging the can end during seaming, and independent means for adjusting said seaming head and said chuck.

17. In a double seamer for uniting cans to filled can bodies, the combination of a seaming head, a chuck for engaging the can end during seaming, a can body lift, and independent means for adjusting said seaming head, said chuck and said lift.

18. In a double seamer for uniting can ends to filled can bodies, the combination of can clamping devices, seaming rolls arranged to engage the can cover and body to form the seam, each said roll being eccentrically mounted and movable by reason of said eccentricity into and out of seaming position, and having a separate eccentric mounting manually operable to move said seaming roll into and out of normal position.

19. In a can closing machine, a seaming head having in combination a plurality of seaming rolls, means for independently adjusting said rolls to any position within limits, and means independent of said adjusting means and movable about a vertical axis for moving one of said rolls together with its adjusting means into inoperative position while on the seaming head and leaving the other roll adjusted for a seaming head operation, and for restoring the inoperative roll to its adjustment by the reversal of such throwing out movement.

20. In a can closing machine, a seaming head having in combination, first and second operation seaming rolls, means for independently adjusting said seaming rolls radially to any position within limits, and means independent of such adjusting means for moving the second operation roll together with its adjusting means into inoperative position while in the seaming head and for restoring the inoperative roll to adjusted position by the reversal of such throw-out movement.

21. In a can closing machine, a seaming head having in combination, first and second operation seaming rolls, means for independently adjusting said seaming rolls radially to any position within limits, and means independent of such adjusting means for temporarily withdrawing the second operation seaming roll from operative position and returning it to operative position in the same adjusted relation.

22. In a can closing machine for uniting can ends to can bodies by means of interfolded and interlocked seams in combination, a seaming head carrying a plurality of seaming rolls, means for adjusting the normal operative relation of said rolls whereby they will operate with more or less pressure while forming interlocked seams uniting can ends to can bodies and additional independent adjusting means for moving one of the rolls together with its pressure adjusting means to inoperative position and temporarily disrupting the adjustment of said roll, said additional adjusting means being adapted to return said roll into restored adjustment.

23. In a can closing machine for uniting can ends to can bodies by means of interfolded and interlocked seams in combination, a seaming head carrying a plurality of seaming rolls, means for adjusting the normal operating relation of the rolls within limits, adjusting means acting outside said limits, said adjusting means being mounted on parallel axes.

24. In a can closing machine for uniting can ends to can bodies by means of interfolded and interlocked seams in combination, a seaming head carrying a plurality of seaming rolls, means for adjusting the normal operating relation of the rolls within limits, adjusting means acting outside said limits, the axes of said adjusting means extending in the same direction.

25. In a can closing machine, a seaming head having in combination, first and second operation seaming rolls, means for individually adjusting said rolls radially, and an eccentric mounted upon a vertical axis and independent of the adjusting means for throwing a said roll temporarily out of action without disturbing its adjustment or removing it from the head and restoring it to its adjusted position.

26. In a multi-spindle double seamer for uniting can ends to can bodies, the combination of a rotatable seaming head carrier, said seaming head carrier comprising a casing having separable sections and seaming heads, each comprising a chuck, knock-out and seaming roll mechanism mounted in a said separable section, said section and said head being removable as a unit.

27. In a multi-spindle double seamer for uniting can ends to can bodies, the combination of a rotatable seaming head carrier, said seaming head carrier comprising a casing having separable sections and seaming heads, each comprising a chuck, knock-out and seaming roll mechanism mounted in a said separable section, said section and said head being removable as a unit, and means disposed through the section and into the body of the carrier for securing said section and head in position.

28. In a multi-spindle double seamer for uniting can ends to filled can bodies, the combination of a rotatable seaming head carrier, seaming heads comprising chuck, knock-out and seaming roll mechanism, a common power member within said carrier for actuating said mechanisms, each said seaming head constituting a unit readily removable from said seaming head carrier and thereafter insertible into driving relation with said power member upon return to position in said carrier.

29. In a multi-spindle double seamer for uniting can ends to can bodies, the combination of a rotatable seaming head carrier, said carrier comprising a casing, and a plurality of seaming head units, each including seaming rolls, chuck, and knock-out, said units being bodily removable laterally of the casing.

30. In a machine for uniting can ends and can bodies comprising seaming mechanism, a continuously moving can and can end advancing member, can feed means and can end feed means associated therewith, a can end marking device located along the path traversed by can ends when moved by said continuously moving member, means whereby can ends are moved into operative relation with said marking means, are given a period of rest during the marking operation and are then picked up by said continuously moving member and continuously moved into alignment with can bodies to said seaming mechanism.

31. In a machine for uniting can ends to can bodies comprising seaming mechanism, a continuously movable conveyor adapted to convey can bodies continuously and can ends intermittently and bringing a continuously conveyed can body and an intermittently conveyed can end into alignment to be assembled and united by said seaming mechanism.

32. In a machine for uniting can ends to can bodies comprising seaming mechanism, a continuously moving conveyor adapted to convey can ends intermittently to an operating station and at the same time moving can bodies continuously and bringing said can ends and can bodies successively into alignment to be assembled and united by said seaming mechanism.

33. In a machine for uniting can ends to can bodies, comprising uniting means and continuously moving conveying means adapted to simultaneously move can ends intermittently and can bodies continuously with means for operating on said can ends during their passage through the machine.

34. In a double seamer for uniting can ends to filled can bodies, the combination of, a seaming mechanism, and a rotatable turret for delivering cans and ends to said seaming mechanism, said turret supporting said end above the can and by engagement with a single side thereof.

35. In a machine for uniting can ends to filled can bodies, the combination of a continuously rotating turret, a head above said turret and provided with a plurality of seam forming mechanisms, a support for said head and turret arranged off the center of rotation, receiving and timing means, transfer means, and discharge means associated in timed relation with said turret.

36. In a machine for uniting can ends to filled can bodies, the combination of multi-seaming mechanisms, means for conveying cans and ends to said seaming mechanisms, timing means for delivering cans to said conveying means, said timing means comprising a plurality of members for accelerating said cans in timed relation with said conveying means.

PAUL W. FLEISCHER.
FELIX HUNTAR.